(12) United States Patent
Geddes

(10) Patent No.: US 8,822,228 B2
(45) Date of Patent: Sep. 2, 2014

(54) CONVERSION OF JUST-CONTINUOUS METALLIC FILMS TO LARGE PARTICULATE SUBSTRATES FOR METAL-ENHANCED FLUORESCENCE

(75) Inventor: Chris D. Geddes, Bel-Air, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 475 days.

(21) Appl. No.: 12/864,562

(22) PCT Filed: Jan. 30, 2009

(86) PCT No.: PCT/US2009/032583
§ 371 (c)(1),
(2), (4) Date: Oct. 14, 2010

(87) PCT Pub. No.: WO2009/148634
PCT Pub. Date: Dec. 10, 2009

(65) Prior Publication Data
US 2011/0020946 A1    Jan. 27, 2011

Related U.S. Application Data

(60) Provisional application No. 61/024,576, filed on Jan. 30, 2008.

(51) Int. Cl.
*G01N 21/76* (2006.01)
*B82Y 30/00* (2011.01)
*B22F 9/02* (2006.01)
*B22F 1/00* (2006.01)

(52) U.S. Cl.
CPC . *B22F 9/02* (2013.01); *B82Y 30/00* (2013.01); *B22F 2999/00* (2013.01); *B22F 1/0018* (2013.01)
USPC ............... 436/172; 427/157; 252/301.4 R

(58) Field of Classification Search
CPC ...................................................... B82Y 30/00
See application file for complete search history.

(56) References Cited

U.S. PATENT DOCUMENTS

| | | |
|---|---|---|
| 5,017,009 A | 5/1991 | Schutt et al. |
| 5,449,918 A | 9/1995 | Krull et al. |

(Continued)

FOREIGN PATENT DOCUMENTS

| | | |
|---|---|---|
| WO | 89/09408 | 10/1989 |
| WO | WO89/09408 | 10/1989 |

(Continued)

OTHER PUBLICATIONS

Aslan, Kadir et al. Annealed Silver-Island Films for Applications in Metal-Enhanced Fluorescence: Interpretation in Terms of Radiating Plasmons, Sep. 2005, Journal of Fluorescence, vol. 15, No. 5, pp. 643-654.

(Continued)

*Primary Examiner* — Robert Xu
(74) *Attorney, Agent, or Firm* — Marianne Fuierer; Moore & Van Allen, PLLC

(57) ABSTRACT

The present invention relates to a method of producing silver films having large nanoparticles caused by cracking during anaerobic annealing to provide surfaces that exhibit increased metal enhanced fluorescence. Preferably the annealing process is conducted on a silver film having a thickness from about 14 to 17 nm for about an hour at a temperature of approximately 190° C. to about 210° C. resulting in the conversion of the just-continuous films into large particulate films, not readily assessable by other chemical deposition techniques.

17 Claims, 16 Drawing Sheets

(56) References Cited

U.S. PATENT DOCUMENTS

| | | | |
|---|---|---|---|
| 5,866,433 | A | 2/1999 | Schalkhammer et al. |
| 7,095,502 | B2 | 8/2006 | Lakowicz et al. |
| 7,253,452 | B2 | 8/2007 | Steckel et al. |
| 7,348,182 | B2 | 3/2008 | Martin et al. |
| 7,351,590 | B2 | 4/2008 | Martin |
| 7,400,397 | B2 | 7/2008 | Lakowicz et al. |
| 7,648,834 | B2 | 1/2010 | Moore |
| 7,718,445 | B2 | 5/2010 | Martin |
| 7,718,804 | B2 | 5/2010 | Geddes et al. |
| 7,732,215 | B2 | 6/2010 | Geddes et al. |
| 7,939,333 | B2 | 5/2011 | Geddes et al. |
| 8,008,067 | B2 | 8/2011 | Geddes et al. |
| 8,034,633 | B2 | 10/2011 | Geddes |
| 8,075,956 | B2 | 12/2011 | Geddes et al. |
| 2003/0228682 | A1 | 12/2003 | Lakowicz et al. |
| 2005/0053974 | A1 | 3/2005 | Lakowicz et al. |
| 2006/0017918 | A1 | 1/2006 | Cullum et al. |
| 2006/0147927 | A1 | 7/2006 | Geddes et al. |
| 2007/0269826 | A1 | 11/2007 | Geddes et al. |
| 2008/0215122 | A1 | 9/2008 | Geddes et al. |
| 2009/0022766 | A1 | 1/2009 | Geddes et al. |
| 2009/0325199 | A1 | 12/2009 | Geddes et al. |
| 2010/0028983 | A1* | 2/2010 | Geddes ..................... 435/287.2 |
| 2010/0062545 | A1 | 3/2010 | Geddes et al. |
| 2010/0209937 | A1 | 8/2010 | Geddes et al. |
| 2010/0297016 | A1 | 11/2010 | Geddes et al. |

FOREIGN PATENT DOCUMENTS

| | | |
|---|---|---|
| WO | WO2004/024191 | 3/2004 |
| WO | WO2006/074130 | 7/2006 |

OTHER PUBLICATIONS

Aslan, Kadir et al. Metal-Enhanced fluorescence from silver nanoparticle-deposited polycarbonate substrates, 2006, J. Mater. Chem., vol. 16, pp. 2846-2852.
Geddes, Chris D. et al. Metal-Enhanced Fluorescence (MEF) Due to Silver Colloids on a Planar Surface: Potential Applications of Indocyanine Green to in Vitro Imaging, 2003, J. Phys. Chem. A., vol. 107, pp. 3443-3449.
C. D. Geddes and J. R. Lakowicz, Metal-enhanced fluorescence, Journal of Fluorescence 12, 121-129 (2002).
K. Aslan, I. Gryczynski, J. Malicka, E. Matveeva, J. R. Lakowicz, and C. D. Geddes, Metal-enhanced fluorescence: an emerging tool in biotechnology, Current Opinion in Biotechnology 16, 55-62 (2005).
K. Aslan, M. J. R. Previte, Y. X. Zhang, and C. D. Geddes, Metal-enhanced fluorescence (MEF): Progress towards a unified plasmon-fluorophore theory, Biophysical Journal, 371A-371A (2007).
J. R. Lakowicz, Radiative decay engineering: Biophysical and biomedical applications, Analytical Biochemistry 298, 1-24 (2001).
Y. Zhang, K. Aslan, M. J. Previte, and C. D. Geddes, Metal-enhanced S-2 fluorescence from azulene, Chemical Physics Letters 432, 528-532 (2006).
M. H. Chowdhury, K. Aslan, S. N. Malyn, J. R. Lakowicz, and C. D. Geddes, Metal-enhanced chemiluminescence: Radiating plasmons generated from chemically induced electronic excited states, Applied Physics Letters 88, 173104 (2006).
Y. Zhang, K. Aslan, M. J. Previte, and C. D. Geddes, Metal-enhanced fluorescence: Surface plasmons can radiate a fluorophore's structured emission, Applied Physics Letters 90, 053107 (2007).
K. Aslan, Z. Leonenko, J. R. Lakowicz, and C. D. Geddes, Annealed silver-island films for applications in metal-enhanced fluorescence: Interpretation in terms of radiating plasmons, Journal of Fluorescence 15, 643-654 (2005).
J. Yguerabide and E. E. Yguerabide, Light-scattering submicroscopic particles as highly fluorescent analogs and their use as tracer labels in clinical and biological applications—I. Theory, Analytical Biochemistry 262, 137-156 (1998).
K. Aslan, S. N. Malyn, and C. D. Geddes, Angular-dependent metal-enhanced fluorescence from silver colloid-deposited films: opportunity for angular-ratiometric surface assays, Analyst 132, 1112-1121 (2007).
K. Aslan, P. Holley, L. Davies, J. R. Lakowicz, and C. D. Geddes, Angular-ratiometric plasmon-resonance based light scattering for bioaffinity sensing, Journal of the American Chemical Society 127, 12115-12121 (2005).
Y. Zhang, K. Aslan, M. J. R. Previte, and C. D. Geddes; Metal-enhanced fluorescence from copper substrates, vol. 90 (AIP, 2007), p. 173116.
M. H. Chowdhury, S. N. Malyn, K. Aslan, J. R. Lakowicz, and C. D. Geddes, Multicolor directional surface plasmon-coupled chemiluminescence, Journal of Physical Chemistry B 110, 22644-22651 (2006).
M. J. R. Previte, K. Aslan, Y. X. Zhang, and C. D. Geddes, Metal-enhanced surface plasmon-coupled phosphorescence . Journal of Physical Chemistry C 111, 6051-6059 (2007).
C. Zhang, K. Abdijalilov, and H. Grebel, Surface enhanced Raman with anodized aluminum oxide films , J Chem Phys 127, 044701 (2007).
K. R. Strehle, D. Cialla, P. Rosch, T. Henkel, M. Kohler, and J. Popp, A reproducible surface-enhanced Raman spectroscopy approach. Online SERS measurements in a segmented microfluidic system, Anal Chem 79, 1542-7 (2007).
Q. Yu and G. Golden, Probing the protein orientation on charged self-assembled monolayers on gold nanohole arrays by SERS, Langmuir 23, 8659-62 (2007).
K. Aslan, J. Huang, G. M. Wilson, and C. D. Geddes, Metal-enhanced fluorescence-based RNA sensing, Journal of the American Chemical Society 128, 4206-4207 (2006).
D. S. dos Santos and R. F. Aroca, Selective surface-enhanced fluorescence and dye aggregation with layer-by-layer film substrates, Analyst 132, 450-454 (2007).
C. D. Geddes, A. Parfenov, D. Roll, J. Y. Fang, and J. R. Lakowicz, Electrochemical and laser deposition of silver for use in metal-enhanced fluorescence, Langmuir 19, 6236-6241 (2003).
A. Feofanov, A. Ianoul, E. Kryukov, S. Maskevich, G. Vasiliuk, L. Kivach, and I. Nabiev, Nondisturbing and stable SERS-active substrates with increased contribution of long-range component of Raman enhancement created by high-temperature annealing of thick metal films, Analytical Chemistry 69, 3731-3740 (1997).
K. Aslan, P. Holley, and C. D. Geddes, Metal-enhanced fluorescence from silver nanoparticle-deposited polycarbonate substrates, Journal of Materials Chemistry 16, 2846-2852 (2006).
H. J. Park, D. Vak, Y. Y. Noh, B. Lim, and D. Y. Kim, Surface plasmon enhanced photoluminescence of conjugated polymers, Applied Physics Letters 90 (2007).
D. S. Dunn, N. Sridhar, M. A. Miller, K. T. Price, R. Pabalan, and T. A. Abrajano, Jr., Development of a surface-enhanced Raman technique for biomarker studies on Mars, Appl Spectrosc 61, 25-31 (2007).
H. Li and B. M. Cullum, Dual Layer and Multilayer Enhancements from Silver Film over Naostructured Surface-Enhanced Raman Substrates, Appl Spectrosc 59, 410-7 (2005).
M. Kawasaki and S. Mine, Enhanced molecular fluorescence near thick Ag island film of large pseudotabular nanoparticles, Journal of Physical Chemistry B 109, 17254-17261 (2005).
M. Kawasaki and S. Mine, Highly efficient surface-enhanced fluorescence on Ag island film of large pseudotabular nanoparticles, Chemistry Letters 34, 1038-1039 (2005).
Y. Suzuki, Y. Ojima, Y. Fukui, H. Fazyia, and K. Sagisaka, Post-annealing temperature dependence of infrared absorption enhancement of polymer on evaporated silver films, Thin Solid Films 515, 3073-3078 (2007).
N. Strekal, A. Maskevich, S. Maskevich, J. C. Jardillier, and I. Nabiev, Selective enhancement of Raman or fluorescence spectra of biomolecules using specifically annealed thick gold films, Biopolymers 57, 325-8 (2000).
L. Hao and J. Lawrence, The adsorption of human serum albumin (HSA) on CO2 laser modified magnesia partially stabilised zirconia (MgO-PSZ), Colloids and Surfaces B-Biointerfaces 34, 87-94 (2004).
K. Aslan and C. D. Geddes, Microwave-accelerated and metal-enhanced fluorescence myoglobin detection on silvered surfaces: Potential application to myocardial infarction diagnosis, Plasmonics 1, 53-59 (2006).

(56) References Cited

OTHER PUBLICATIONS

I. Doron-Mor, Z. Barkay, N. Filip-Granit, A. Vaskevich, and I. Rubinstein, Ultrathin gold island films on silanized glass. Morphology and optical properties, Chemistry of Materials 16, 3476-3483 (2004).

C. D. Geddes, H. Cao, I. Gryczynski, Z. Gryczynski, J. Fang, and J. R. Lakowicz, Metal-enhanced fluorescence (MEF) due to silver colloids on a planar surface: Potential applications of indocyanine green to in vivo imaging, Journal of Physical Chemistry A 107, 3443-3449 (2003).

K. Aslan, S. N. Malyn, and C. D. Geddes, Metal-enhanced fluorescence from gold surfaces: Angular dependent emission, J Fluoresc 17, 7-13 (2007).

G. Bauer, F. Pittner and Th. Schalkhammer, Metal Nano-Cluster Biosensors, Mikrochim. Acta 131, 107-114 (1999).

Th. Schalkhammer, Metal Nano Clusters as Transducers for Bioaffinity Interactions, Monatschefte für Chemie 129, 1067-1092 (1998).

* cited by examiner

A Scattering Before, 15 nm Ag

Scattering After, 15 nm Ag

B  Fluorescence Before

Fluorescence After

A  Fluorescence emission on glass

B  Fluorescence enhancement factor

CONVERSION OF JUST-CONTINUOUS METALLIC FILMS TO LARGE PARTICULATE SUBSTRATES FOR METAL-ENHANCED FLUORESCENCE

CROSS-REFERENCE TO RELATED APPLICATIONS

This application is filed under the provisions of 35 U.S.C. §371 and claims the priority of International Patent Application No. PCT/US2009/032583 filed on Jan. 30, 2009, which in turn claims priority of U.S. Provisional Application No. 61/024,576 filed on Jan. 30, 2008, the contents of which are incorporated by reference herein for all purposes.

BACKGROUND OF THE INVENTION

1. Field of the Invention

The present invention relates to producing silver films, and more particularly, to films having large particles caused by cracking during anaerobic annealing to provide surfaces that exhibit metal enhanced fluorescence.

2. Related Art

In recent years it has been both described and demonstrated many new favourable photophysical effects of electronically excited states (fluorophores/luminophores) in close-proximity to plasmon resonant particles have been both described and demonstrated. (1-3) The coupled fluorophore lifetime is also observed to be much shorter than the "free-space lifetime", reflecting the very fast "plasmon" lifetime of the coupled quanta. (5-7) Further, it is thought that the MEF effect is a consequence of an excited state coupling with the scattering mode of nanoparticles, which is thought to account for very fast MEF lifetimes, i.e. a coupled elastic scattering event. (3,8) For metallic nanoparticles, the extinction spectrum is comprised of both an absorption and scattering component. (9) For smaller particles (<25 nm), then the extinction is for the most part dominated by absorption, while for larger particles, by scattering. For a fixed wavelength, this scales as the radius cubed and to the sixth power respectively. (9) Given that MEF is thought to be the ability of a nanoparticle to plasmon scatter coupled quanta (i.e. fluorescence, phosphorescence etc), (3) then concordantly larger particles would certainly be ideal for MEF. (3,8)

It is this train of thought which readily accounts for the numerous reports of luminescence quenching by small metallic nanoparticles. While the mechanism for MEF is fairly new, (3) compelling data has been reported wherein: i) MEF is seen to be more pronounced for larger particles; ii) the wavelength dependence of MEF suggests a correlation between the scattering spectra of the nanoparticles and the emission spectra of the fluorophores; iii) MEF is angular dependent, (10) both from an observation and excitation perspective, similar to scattering by nanoparticles themselves (11); iv) metals ideal for MEF are those with high free electron densities (12); and v) continuous metallic films have been shown to couple fluorophore emission, when fluorophores are positioned less than 100 nm from the surface. In addition, the coupled emission has been shown to be completely p-polarized, strongly indicating that the coupled-plasmon system is radiating. (13,14)

Silver is usually the noble metal of choice (12, 15-17) for applications in MEF and Surface-Enhanced Raman Spectroscopy. The preparation of silvered substrates include several modes of deposition, such as by wet chemistry, (18) a layer-by-layer deposition technique, (19) electrochemically, (20) on glass, (21) plastic substrates, (22) and on indium tin oxide. (23) One of the most commonly used techniques is vapor-deposition (21, 24-27) as it yields the most reproducible substrates amongst the deposition techniques aforementioned. After the deposition of silver films onto substrates, a high-temperature post-annealing process can also be applied to introduce a quasiperiodic roughness that further increases the utility of these surfaces. (21,28,29)

However, heretofore producing larger nanoparticles with consistency in size has been difficult to grow/produce by other wet-chemical deposition techniques without forming a continuous film. Thus, it would be advantageous to develop a method of forming large particles that do not spread into a continuous film.

SUMMARY OF THE INVENTION

The present invention relates to a method of fabricating a surface that includes a plurality of nanoparticles that exhibit increased metal enhanced fluorescence, the method comprising:
  a) providing a substrate;
  b) depositing a layer of silver on the substrate to form a silver film coating the substrate;
  c) heating the silver film and substrate to a temperature of from about 170° C. to about 230° C. under anaerobic conditions for a sufficient amount of time to provide crackage in the silver film thereby forming annealed nanoparticles, wherein the annealed nanoparticles provide for increased metal enhanced fluorescence relative to unannealed film.

Preferably, the heating period is approximately 0.5 to 2.5 hours and preferably about 1 hour. The thickness of the deposited silver film layer, before annealing, is from about 12 nm to about 17 nm and more preferably from about 14 nm to 16 nm thick. The surface substrate can be glass, quartz, polymeric or a metallic surface not including silver. Annealing temperatures are in the range from 170° C. to about 230° C., and more preferably from about 190° C. to about 210° C. Notably, the individual nanoparticles have a surface plasmon resonance (SPR) peak that is blue shifted after annealing, thus there is a difference between absorption spectra between unannealed silver islands and annealed larger silver particles. The annealing of the silver film layer causes the film layer to crack and form a topography that includes nanoparticles having a broader cross-section that causes the difference in the absorption spectra. Preferably, the nanoparticles have an approximate cross-sectional diameter greater than from 60 nm to about 150 nm.

Notably during the annealing process the mass of silver on the surface is conserved and thus redistributed, thereby causing a height increase in formed particles relative to that of the originally deposited film layer.

In another aspect, the present invention provides for a cracked silver surface that comprises nanoparticles that exhibit enhanced fluorescence, the surface fabricated by a method comprising:
  a) providing a substrate;
  b) depositing a layer of silver on the substrate to form a silver coated substrate;
  c) heating the silver coated substrate to a temperature of about 200° C. under anaerobic conditions for a sufficient amount of time to form a cracked film with globulates, wherein the globulates cause about a 30 fold enhancement in fluorescence when used for metal enhanced fluorescence and compared to silver particles ranging from about 20 nm to 60 nm.

In yet another aspect, the present invention relates to a detection method exhibiting increased fluorescence emitted during metal-enhanced fluorescence sensing, the detection method comprising:

applying a metallic material to a surface substrate used in a detection system, wherein the metallic material is formed by:
providing a substrate;
depositing a 12 to 17 nm thick layer of silver on the substrate to form a silver film coating the substrate;
heating the silver film and substrate to a temperature of about 190° C. to 210° C. under anaerobic conditions for a sufficient amount of time to form annealed nanoparticles;
providing a an intrinsic or extrinsic fluorophore for disposing near the annealed nanoparticles,
exciting the fluorophore with an electromagnetic source to cause fluorescing; and
measuring the fluorescence emission within the fluorophore and/or annealed nanoparticles.

The detection method can be further enhanced by applying electromagnetic energy in the microwave range to cause an increase in heat in the system thereby increasing the kinetics of any chemical reactions occurring within the detection system Another aspect of the present invention relates to a silver biosensor surface comprising silver nanoparticles dispersed in a thin silver film on a substrate, wherein the silver sensor surface was formed by depositing a layer of silver on the substrate, annealing the silver surface under anaerobic conditions and at a temperature that provides movement within the silver layer thereby forming a cracked surface and particles having a height greater than the thickness of the unannealed deposited layer of silver and a thin silver film layer less than the unannealed deposited thickness.

Other aspects and advantages of the invention will be more fully apparent from the ensuing disclosure and appended claims.

DETAILED DESCRIPTION OF THE INVENTION

Figure 1A:
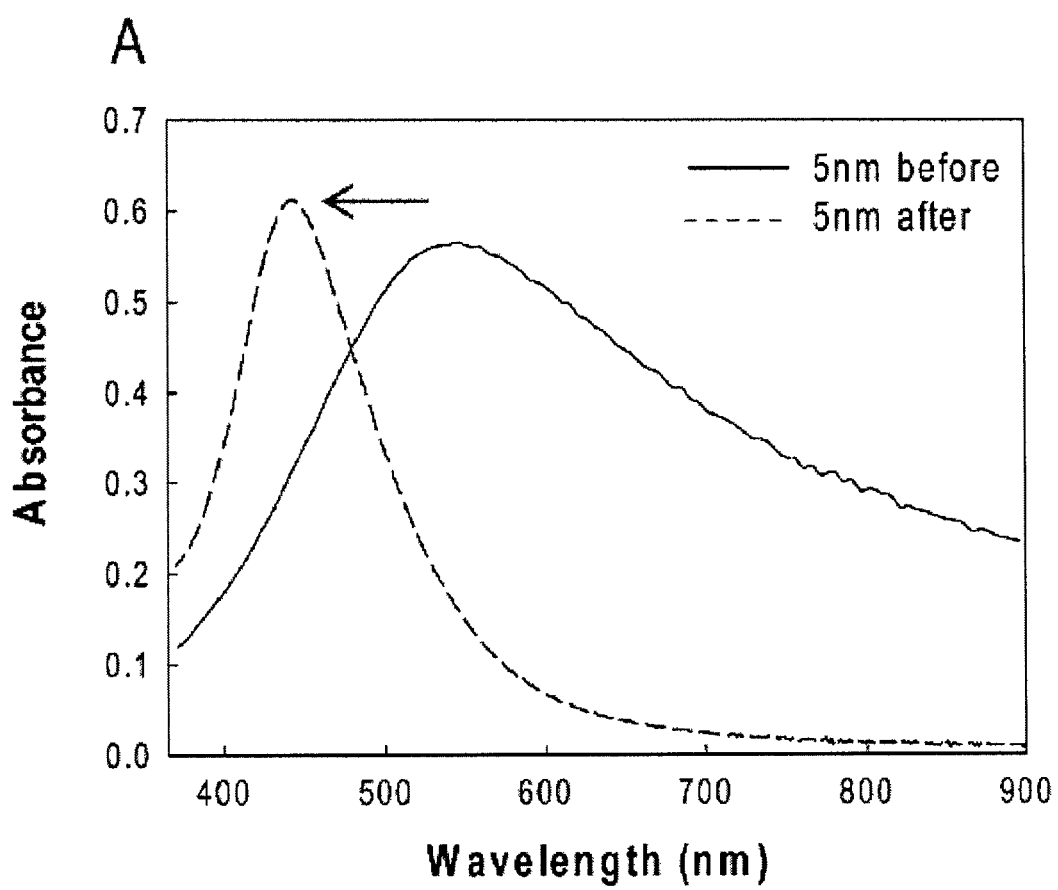
FIGS. 1 A, B and C show the absorption spectrum of (A) 5 nm, (B) 15 nm and (C) 25 nm thick silver films deposited onto amine-coated glass microscope slides before and after annealing at 200° C. for 1 hour. The oven was nitrogen purged. The arrows indicate the blue-shift in the surface plasmon resonance peak of silver after annealing.

The present invention relates to a method for fabricating films comprising larger nanoparticles that can be used in systems using metal enhanced fluorescence. The effects of high-temperature annealing on thick silver films (TSFs) has been investigated herein and the results show that annealed TSFs, having a thickness from about 10 to 17 nm, can be used for numerous applications in metal-enhanced fluorescence.

Specifically the annealed surfaces may be used in numerous systems and methods including those described in U.S. patent application Ser. No. 10/536,502 entitled HIGH-SENSITIVITY ASSAYS FOR PATHOGEN DETECTION USING METAL ENHANCED FLUORESCENCE; U.S. patent application Ser. No. 11/917,804 entitled METAL-ENHANCED FLUORESCENCE-BASED SENSING METHODS; U.S. patent application Ser. No. 11/718,560 entitled METAL-ENHANCED FLUORESCENCE FROM PLASTIC SUBSTRATES; U.S. patent application Ser. No. 11/719,731 entitled MICROWAVE ACCELERATED ASSAYS; U.S. patent application Ser. No. 11/695,397 entitled MICROWAVE ACCELERATED PLASMONICS; International Patent Application No. PCT/US08/65801 entitled FLUORESCENCE MICROWAVE MICROSCOPY; U.S. patent application Ser. No. 12/036,402 entitled MICROWAVE FOCUSED CHEMILUMINESCENCE; U.S. patent application Ser. No. 11/750,119 entitled ANGULAR DEPENDENT METAL-ENHANCED FLUORESCENCE; U.S. patent application Ser. No. 12/020,571 entitled METAL-ENHANCED SINGLET OXYGEN GENERATION; U.S. patent application Ser. No. 11/917,075 entitled BIOASSAYS USING PLASMONIC SCATTERING FROM NOBLE METAL NANOSTRUCTURES; and U.S. patent application Ser. No. 11/997,778 entitled NANOSTRUCTURES FOR POLARIZED IMAGING AND RECEPTOR/LIGAND QUANTIZATION, the contents of such applications are hereby incorporated by reference herein for all purposes.

Most knowledge relating to fluorescence is based on measurements of the spectroscopic properties of fluorophores that upon excitation, radiate into a homogeneous and non-conducting medium, typically referred to as free space. These spectral properties are well described by Maxwell's equations for a radiating oscillating dipole. However, the interactions of an emitting dipole with physical objects can be considerably more complex, as known from antenna and receiver design. The size and shape of an antenna are designed with the goal of directing the radiation and accounting for its interactions with the earth's surface. A fluorophore is also like an antenna, but one, which oscillates at high frequency and radiates short wavelengths. Local effects are not usually seen because of the small size of fluorophores relative to the experimental apparatus.

It is known that conducting metallic surfaces can respond to a fluorophores oscillating dipole and modify the rate of emission, that is the intrinsic radiative decay rate, and the spatial distribution of the emitted radiation. Theoreticians describe this effect as due to changes in the photonic mode density near the fluorophore. In most spectroscopic measurements, the solution or medium is transparent to both the emitted and sampling radiation. However, there are several important exceptions to the free space condition. One well-known example is Surface Enhanced Raman Scattering (SERS). It is known that the presence of a metallic surface can enhance the Raman signals by factors of $10^3$ to $10^8$, and reports of even larger $10^{14}$-$10^{16}$ fold enhancements have appeared. The presence of a nearby metal film, island or particle can also alter the emission properties of fluorophores. The most well known effect is the quenching of fluorescence by a near-by metal. The emission of fluorophores within 50 Å of a metal surface is almost completely quenched. This effect is used in fluorescence microscopy with evanescent wave excitation. The emission from membranes cellular regions near the quartz-water interface is quenched, allowing selective observation of the emission from the cytoplasmic region more distance from the solid-liquid interface. In addition to quenching, it is known that metal surfaces or particles can cause significant increases in fluorescence. Remarkably, depending on the distance and geometry, metal surfaces or particles can result in enhancement factors of many 1000 fold for the fluorescence emission of fluorophores.

"Fluorophore," and "fluorescence label," used interchangeably herein, means any substance that emits electromagnetic energy such as light at a certain wavelength (emission wavelength) when the substance is illuminated by radiation of a different wavelength (excitation wavelength) and is intended to encompass a chemical or biochemical molecule or fragments thereof that is capable of interacting or reacting specifically with an analyte of interest in a sample to provide one or more optical signals. Additionally fluorophore includes both extrinsic and intrinsic fluorophores. Extrinsic fluorophore refer to fluorophores bound to another substance. Intrinsic fluorophores refer to substances that are fluorophores themselves. Exemplary fluorophores include but are not limited to those listed in the Molecular Probes Catalogue which is incorporated by reference herein.

Representative fluorophores include but are not limited to Alexa Fluor® 350, Dansyl Chloride (DNS-Cl), 5-(iodoacetamida)fluoroscein (5-IAF); fluoroscein 5-isothiocyanate (FITC), tetramethylrhodamine 5-(and 6-)isothiocyanate (TRITC), 6-acryloyl-2-dimethylaminonaphthalene (acrylodan), 7-nitrobenzo-2-oxa-1,3,-diazol-4-yl chloride (NBD-Cl), ethidium bromide, Lucifer Yellow, 5-carboxyrhodamine 6G hydrochloride, Lissamine rhodamine B sulfonyl chloride, Texas Red™ sulfonyl chloride, BODIPY™, naphthalamine sulfonic acids including but not limited to 1-anilinonaphthalene-8-sulfonic acid (ANS) and 6-(p-toluidinyl)naphthalene-2-sulfonic acid (TNS), Anthroyl fatty acid, DPH, Parinaric acid, TMA-DPH, Fluorenyl fatty acid, Fluorescein-phosphatidylethanolamine, Texas red-phosphatidylethanolamine, Pyrenyl-phophatidylcholine, Fluorenyl-phosphotidylcholine, Merocyanine 540, 1-(3-sulfonatopropyl)-4-[4-.beta.-[2 [(di-n-butylamino)-6 naphthyl]vinyl]pyridinium betaine (Naphtyl Styryl), 3,3'dipropylthiadicarbocyanine (diS-$C_3$-(5)), 4-(p-dipentyl aminostyryl)-1-methylpyridinium (di-5-ASP), Cy-3 Iodo Acetamide, Cy-5-N-Hydroxysuccinimide, Cy-7-Isothiocyanate, rhodamine 800, IR-125, Thiazole Orange, Azure B, Nile Blue, Al Phthalocyanine, Oxaxine 1,4',6-diamidino-2-phenylindole (DAPI), Hoechst 33342, TOTO, Acridine Orange, Ethidium Homodimer, N(ethoxycarbonylmethyl)-6-methoxyquinolinium (MQAE), Fura-2, Calcium Green, Carboxy SNARF-6, BAPTA, coumarin, phytofluors, Coronene, and metal-ligand complexes.

Representative intrinsic fluorophores include but are not limited to organic compounds having aromatic ring structures including but not limited to NADH, FAD, tyrosine, tryptophan, purines, pyrimidines, lipids, fatty acids, nucleic acids, nucleotides, nucleosides, amino acids, proteins, peptides, DNA, RNA, sugars, and vitamins. Additional suitable fluorophores include enzyme-cofactors; lanthanide, green fluorescent protein, yellow fluorescent protein, red fluorescent protein, or mutants and derivates thereof.

Metal-enhanced fluorescence provides enhanced intensity, while simultaneously shortening the lifetime of emissions. The emission enhancement may be observed at distances according to the type of fluorophore to be detected and the type, shape of the metal material, noting a difference between a film and a metallic island or colloid. For example, emission enhancement may be observed when a fluorophore distances about 4 nm to about 200 nm to metal surfaces. Preferable distances are about 4 nm to about 30 nm, and more preferably, 4 nm to about 20 nm to metal surfaces.

Fluorescence can be detected using devices including, but not limited to, a spectrofluorometer having a light source and detector. Additional detectors may include GaAs-cathode PMT. Further detectors may include photomultiplier tubes. Additionally, it is advantageous for the device to have a monochromator so that specific wavelengths of light may be used to excite a molecule or to detect emissions at a specific wavelength.

Excitation light sources can include arc lamps and lasers, laser diodes and light emitting diode source, and both single and multiple photon excitation sources. In another embodiment, use of a Ti-sapphire laser, Laser Diode (LD) or Light Emitting Diode Sources (LEDs) may be used with the RNA assay of the present invention. For example, using 2-photon excitation at 700-1000 nm and also using short pulse width (<50 pi), high repetition rate (1-80 MHz), laser diode and LED (1 ns, 1-10 MHz) sources. The enhanced sensitivity of the assay using 2-photon excitation, as compared to 1-photon, can be shown by using series dilution with RNA, initially with the Ti-Sapphire system, and later with LEDs and LDs. If a fluorophore absorbs two photons simultaneously, it will absorb enough energy to be raised to an excited state. The fluorophore will then emit a single photon with a wavelength that depends on the fluorophore used and typically in the visible spectra. The use of the Ti-sapphire laser with infrared light has an added benefit, that being, longer wavelengths are scattered less, which is a benefit to high-resolution imaging. Importantly, there is reduced background signal level gained by using 2-photon excitation as compared to 1-photon excitation by utilizing localized excitation near by a metallic particles.

When a sample containing a fluorophore is placed in the spectrofluorometer and exposed to an amount of exciting radiation, the fluorophore emits radiation that is detected by a photomultiplier tube. The fluorescence intensity of a fluorophore can be increased in response to an amount of exciting radiation when the distance between the metal particle and the fluorophore is from about 4 nm to about 2000 nm, preferably from about 40 nm to about 200 nm. The enhancement of fluorescence is, in part due to the localized excitation of the fluorophores when in close proximity to the silver nanoparticles and results in improved photostability of the fluorophores.

In the present invention, the following examples show the results of depositing thick silver films (TSFs) with film thicknesses of about 5, 15 and 25 nm onto glass substrates using the thermal vapor-deposition technique that resulted in non-continuous particulate films, a just-continuous film and a thick continuous film, respectively. The surface morphological changes on TSFs induced by the annealing process were analyzed by absorption spectroscopy, Atomic Force Microscopy (AFM), angular-dependent light scattering and fluorescence techniques. After annealing, an increase in the height (size) of the 5 nm TSFs was observed, as the separation distance between the particles also increased. No change was observed in MEF for 5 nm TSFs as a result of annealing. The annealing of 15 nm TSFs resulted in the conversion of the just-continuous films into large globular particles with a SPR peak around ≈480 nm and subsequently these surfaces yielded up to 30-fold enhancement in fluorescence emission. Much thicker TSFs (25 nm), that showed no SPR peak both before and after annealing, were not beneficial for MEF, confirming the belief that silver films ≈15 nm thick can be annealed to produce large particulate films, not readily assessable by other chemical deposition techniques.

EXAMPLES

Materials. Silver wire (99.999%), standard microscope slides and FITC-HSA were purchased from Sigma-Aldrich. Nanopure water (>18.0 MΩ) purified using a Millipore Milli-Q gradient system was used in all experiments.

Preparation of Thick Silver Films (Tsfs) by Vacuum Vapor Deposition. Tsfs were deposited in a consolidated vacuum vapor deposition system (model 306, BOC Edwards). Glass slides were pretreated by air plasma under $1\times10^{-4}$ mbar for 3 min before depositing the metal film. The silver wire was melted on the filament, evaporated under a pressure of $<1\times10^{-7}$ mbar, and deposited onto the glass slides. The deposition rate was adjusted by the filament current (1 angstrom/sec), and the thickness of film was measured with a quartz crystal microbalance positioned close-to the glass substrate within the deposition chamber.

Annealing of TSFs. Annealing of TSFs was performed in a Fisher Scientific Vacuum Oven (model 280A) at 200° C. for 1 hr. Trace amounts of oxygen in the oven were eliminated by alternately purging the oven with ultra-high purity nitrogen (Airgas, MD) and pumping down to vacuum four times for 10 minutes, before the annealing process commenced.

Metal-Enhanced Fluorescence from TSFs. Binding the FITC-HSA to both the annealed and unannealed TSFs was accomplished by spotting the slide with a 10 μM FITC-HSA solution and allowing to air dry, followed by rinsing with water to remove the unbound material. HSA is known to passively absorb to noble metal surfaces and form a ≈4 nm thick protein monolayer, (30) allowing us to study the fluorescence spectral properties of non-covalent FITC-HSA complexes before and after annealing. By equally coating a TSF with FITC-HSA the enhancement factor (benefit) obtained from using the silver was also determined, i.e., [Intensity on Silver/Intensity on unsilvered glass] and the enhancement factor (benefit) obtained from using Annealed/Unannealed Silver surfaces, given that all surfaces are known to have an ≈equal monolayer protein coverage. In addition, this sample format is characteristic of MEF-based immunoassays, a growing application for both MEF and silvered surfaces. (31)

Angular-Dependent Light Scattering and Fluorescence Measurements. The angular-dependent light scattering and fluorescence intensity of FITC-HSA on annealed silver films of various thicknesses were measured using an X-Y rotating stage (Edmund Optics) that was modified to hold a standard 75 mm×25 mm microscope slide, with a fiber optic mount. TSFs were illuminated with a polarized laser source at 473 nm, a neutral density filter being used to attenuate the laser intensity. The emission was observed through a 488 nm long-pass filter (Edmund Optics). The angular-dependent polarized scattered light from the TSFs, was collected through a dichroic sheet polarizer (Edmund Optics) into a 600 micron broad wavelength fiber that was connected to an Ocean Optics HD2000 spectrofluorometer. The photostability of FITC-HSA on TSFs under constant illumination with a 473 nm laser source was observed by simply measuring the emission at 225 and 340 degrees, for 10 min.

The real-color photographs of FITC-HSA on nonsilvered glass slides and TSFs were taken with a Canon digital camera (51-IS, 3.2 Mega Pixel, 10× optical zoom) using the same long-pass filter that was used for the emission spectra.

Figure 1B:
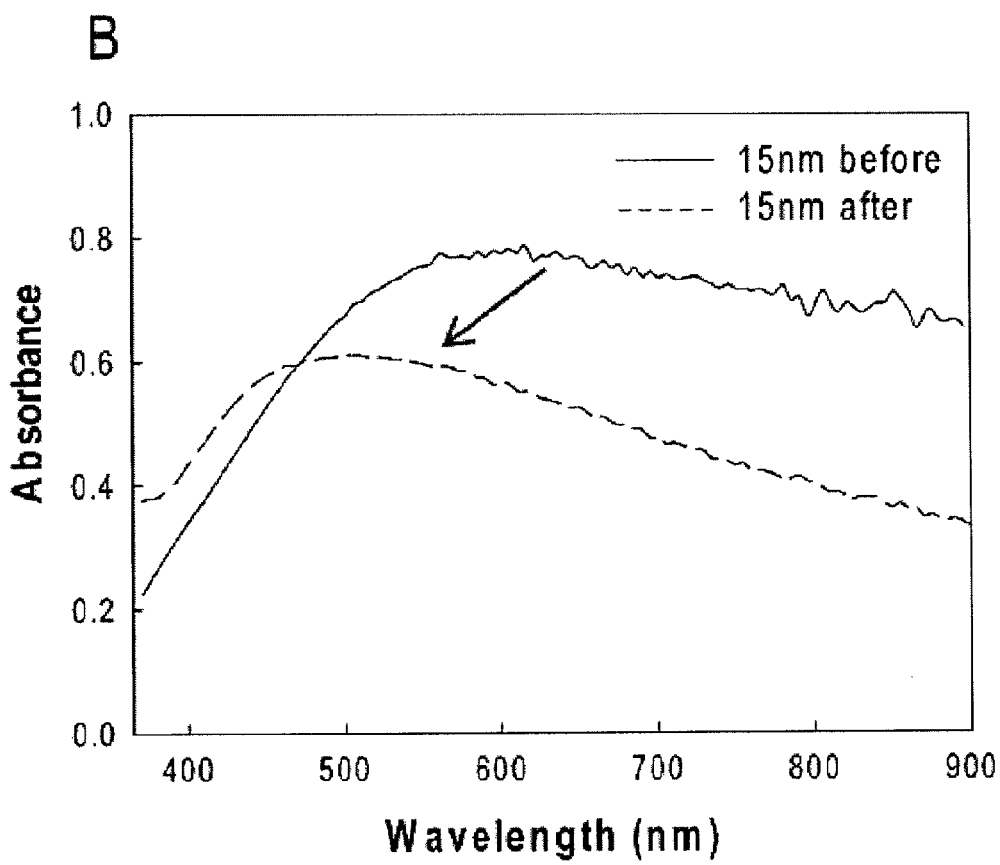
Figure 1C:
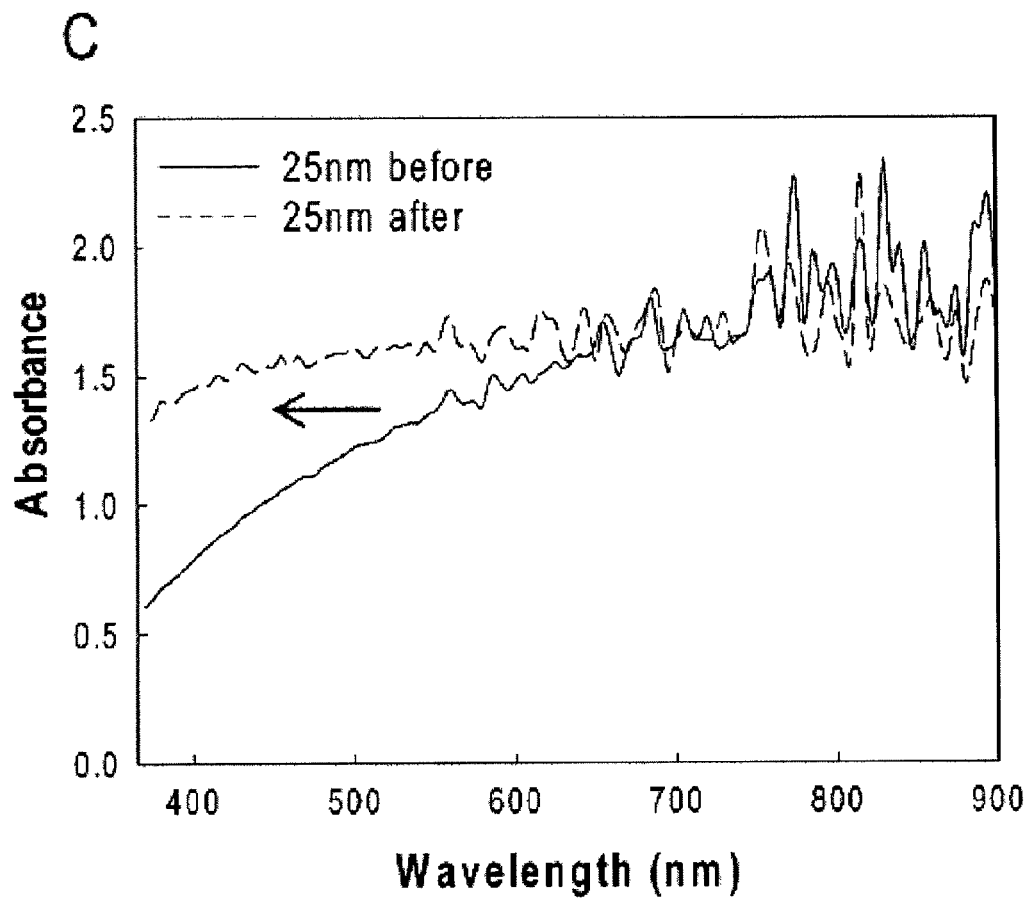

FIGS. 1A, B and C show the absorption spectrum of 5, 15, and 25 nm thick silver films (TSFs) deposited onto amine-coated glass microscope slides both before and after annealing at 200° C. for 1 hour in the absence of oxygen. While 5 and 15 nm TSFs (A and B) showed a surface plasmon resonance (SPR) peak at ≈580 nm before annealing and have a broad absorption at longer wavelengths, 25 nm TSF (C) did not show an SPR peak. This is thought due to fact that evaporated silver films on substrates often become globular films and as the thickness is increased, the distance between the globular particles is decreased, resulting in collective coupled-oscillations of surface plasmons at longer wavelengths, and thus, a broad absorption spectrum is observed, similar to that of a silver mirror. After annealing the silver films at 200° C. for 1 hour, the SPR peaks for 5 nm (FIG. 1A) and 15 nm (FIG. 1B) TSFs blue-shifted to ≈440 nm and ≈480 nm, respectively. Moreover, a narrowing of the absorption spectrum at longer wavelengths is also observed for 5 and 15 nm TSFs after annealing, which indicates that the distance between the globular silver particles is further increased post annealing. In contrast, annealing of the 25 nm (FIG. 1C) TSF did not result in the appearance of any SPR peak, indicating that there was little or no change in the morphology of the thick silver film.

Previous studies on the morphological changes in vapor deposited TSFs on Si wafer after annealing revealed that the change in the morphology of the TSFs is temperature-dependent. (8, 28,29) It was shown that 6-nm TSF appearing as globular structures on Si wafer before annealing, start to break up at an annealing temperature of 100° C., the particles becoming larger and further separated from one another at 200° C., and become even more pronounced at even higher annealing temperatures. (28) Similar results were also reported for 5-30 nm thick gold films, where annealing of gold films at 240° C. resulted in the formation of larger globular structures of gold as the distance between gold globular structures is increased. (29,32) In this regard, it is important to note that the choice of thicknesses of 5, 15, 25 nm silver films was based on the following: before annealing i) 5 nm TSF is considered to be a non-continuous film (i.e., particulate) and is expected to show MEF before annealing, (33); ii) 15 nm TSF is considered to be a just-continuous film (at the deposition rate that was used) and is not expected to show MEF; and iii) 25 nm TSF is considered to be a continuous films and is expected not to show MEF before or even after annealing. The appearance of an SPR peak for 15 nm thick films after annealing, as shown in the enclosed absorption measurements, led to the belief that just-continuous 15 nm TSFs could be converted into efficient substrates for MEF applications, after a post-annealing process, a highly attractive notion, given the difficulties of producing large particulate films by wet-chemical deposition processes without forming continuous films.

According to the previously described Unified Plasmon-Fluorophore Theory (UPFT), (3) MEF is related to the surface plasmons' ability to scatter the fluorophore's coupled emission (larger particles scatter more efficiently) and is therefore thought to be somewhat angular-dependent. (34) Since MEF from plasmonic particle-deposited surfaces (as deposited from a pre-made solution (34) or prepared using an annealing process (8) is more pronounced as the size of the particles increase, experiments were conducted to study the angular-dependent scattering of light (plasmon scattering) and fluorescence emission from the 5, 15 and 25 nm TSFs before and after annealing at 200° C.

Figure 2:
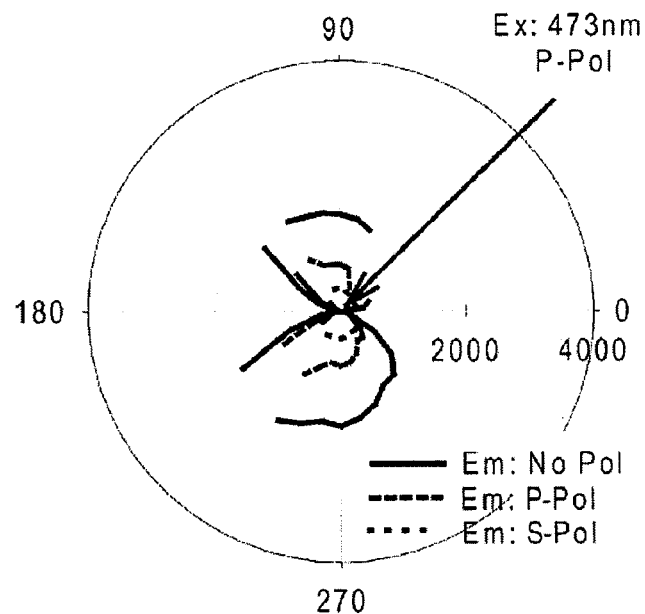
FIGS. 2 A, B, C show the results for 5 nm thick silver films before (top row) and after (bottom row) annealing at 200° C. for 1 hour in a vacuum oven: (A) polar plots for scattering of 473 nm laser light (B) polar plots for fluorescence emission from FITC-HSA coated onto thick silver films, and (C) fluorescence emission spectrum measured at 225 degrees and the real-color photographs of emission from FITC-HSA coated onto silver films. No Pol—No Polarization, P Pol: p-polarization, S Pol: s-polarization.
Figure 2:
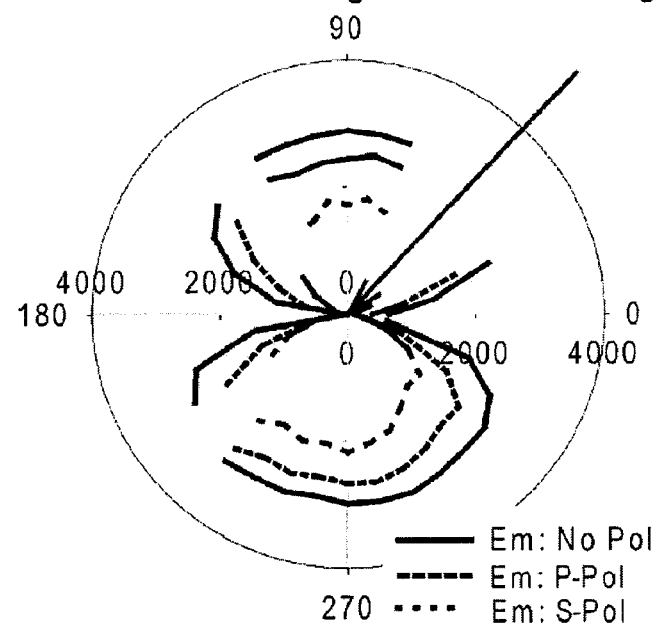
Figure 2:
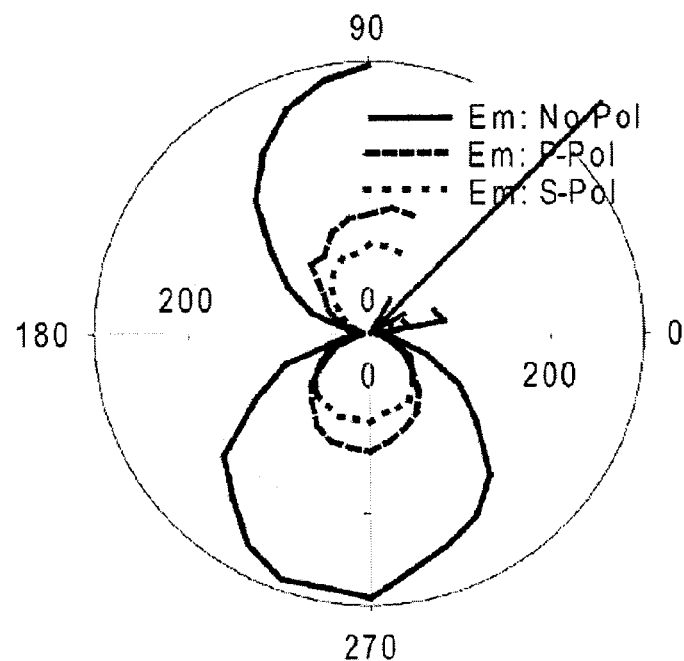
Figure 2:
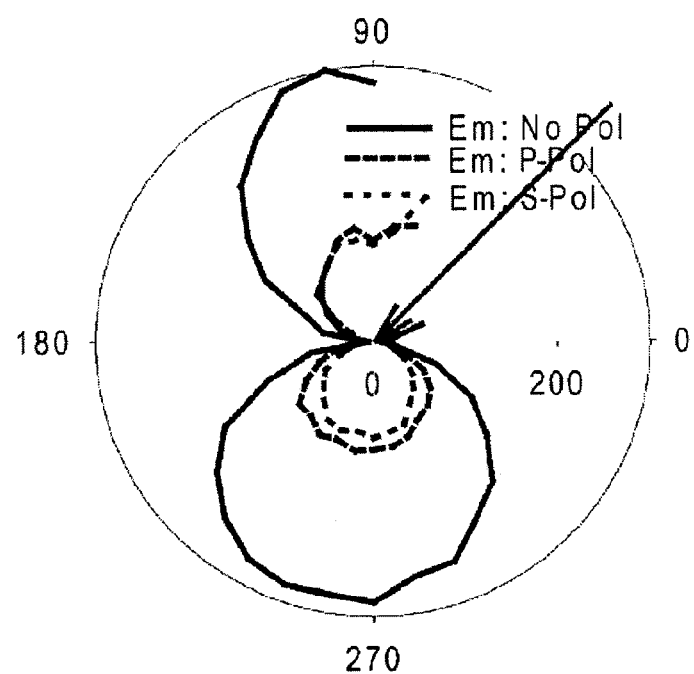
Figure 2:
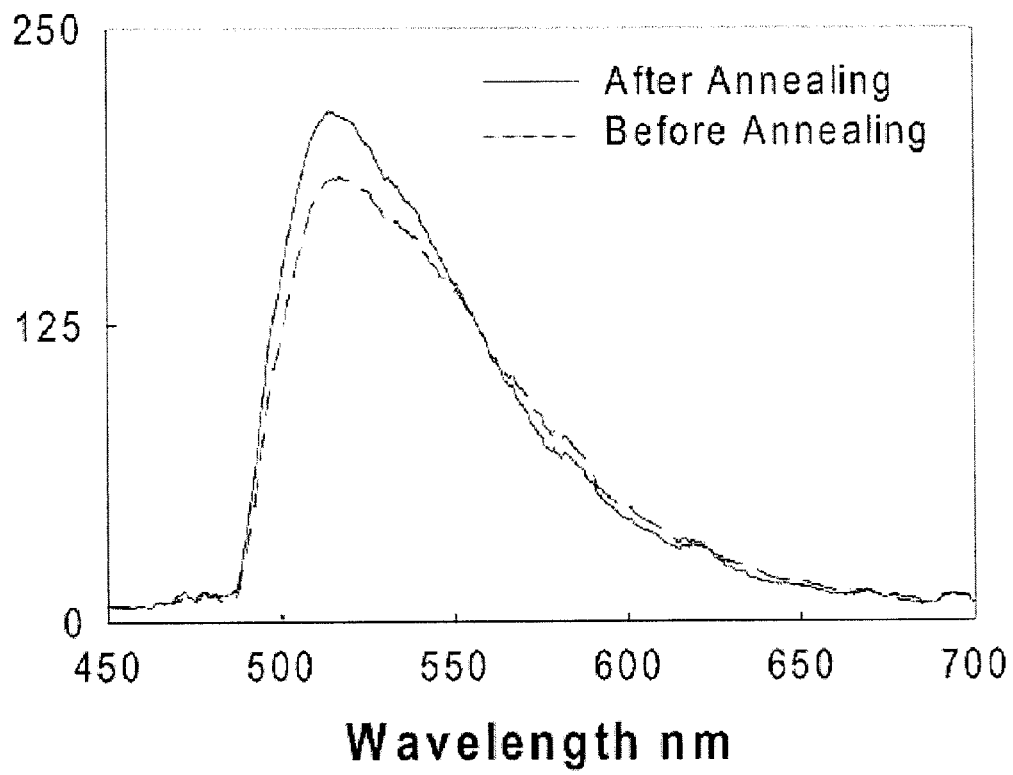
Figure 2:
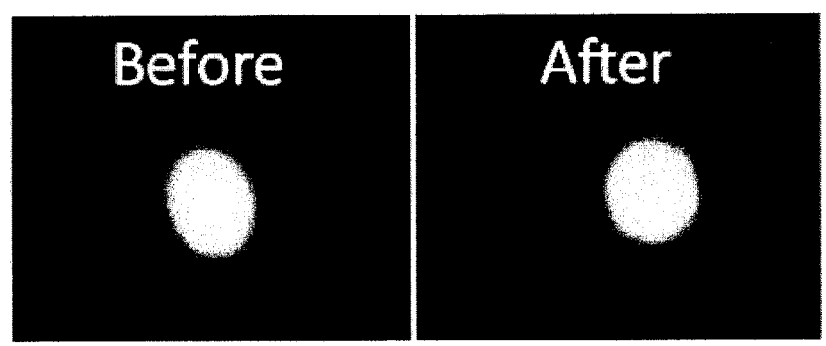
Figure 6:
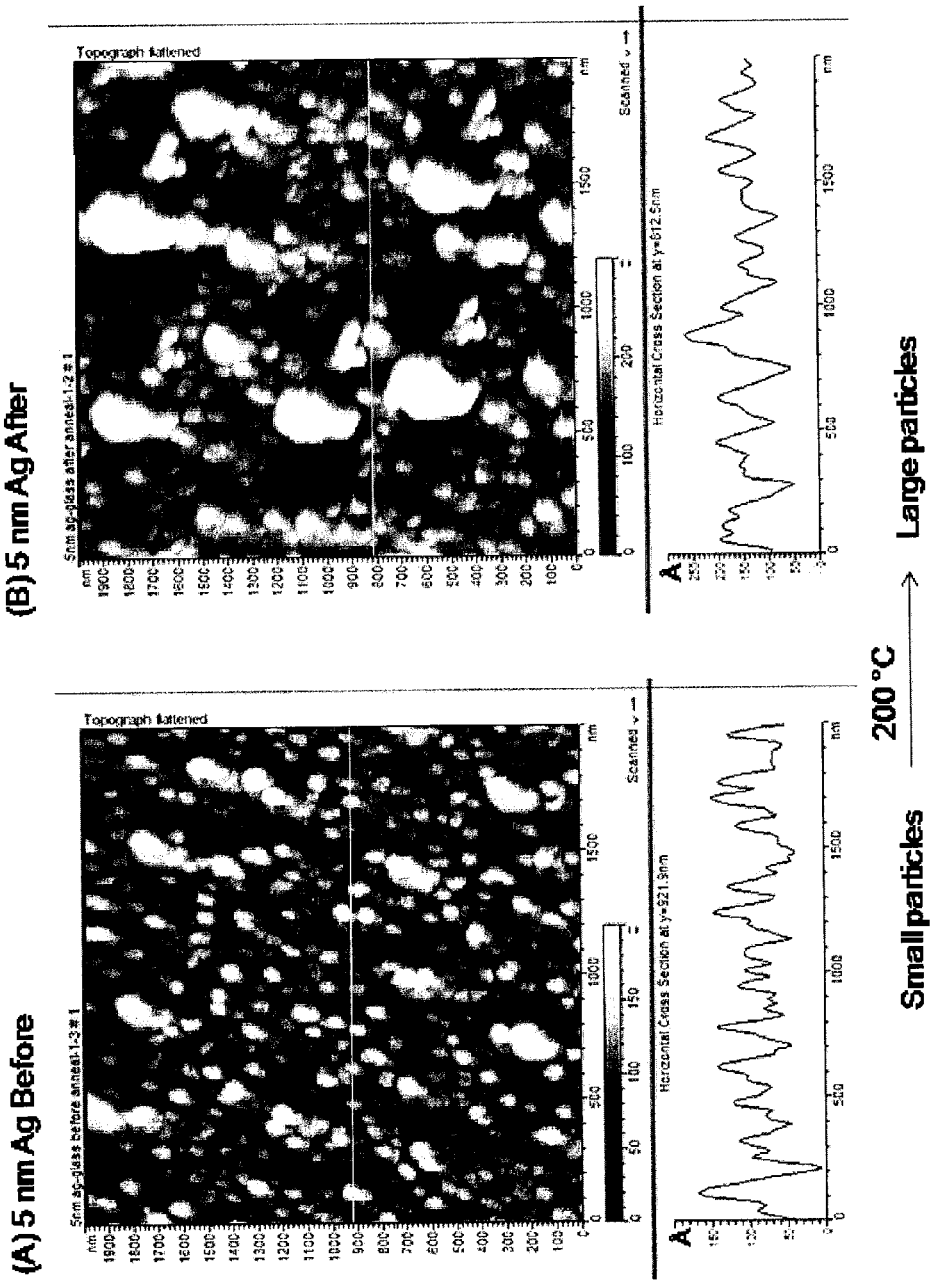
FIG. 6 shows Atomic Force Microscope images of 5 nm thick silver films before (A) and after (B) annealing at 200° C. for 1 hour in a vacuum oven.

FIG. 2A shows polar plots for scattering of 473 nm laser light by 5 nm TSF deposited on a glass microscope slide before and after annealing. As expected, an angular-dependent scattering of laser light was observed for the 5 nm TSF before annealing, which is slightly increased in intensity after annealing at 200° C. This observation was attributed to the increase in height (size) of the silver particles (from an average height of 5 nm to 10 nm) as confirmed by Atomic Force Microscopy (FIG. 6) combined with the increase in distance between the particles that was inferred from the absorption spectra (FIG. 1A). Mass is conserved on the surface during annealing, the particles grow in size but decrease in number. The spacing between the particles also increases as confirmed by AFM analysis. It is important to note that while the increase in particle height (size) results in increased scattering intensities, the larger distances between the particles as a result of the annealing process partially offsets this effect (to the extent that we were unable to quantify here), and thus only a slight increase in the overall angular-dependent scattering intensities is observed for 5 nm TSF.

FIGS. 2B and 2C show the polar plots for fluorescence emission and the fluorescence spectra measured at an angle of 225° from FITC-HSA coated onto 5 nm TSF before and after annealing, respectively. Similar angular-dependent fluorescence emission intensities were observed from 5 nm TSFs both before and after annealing, as also shown by the emission spectra measured at an observation angle of 225°. Further, visual evidence for similar fluorescence emission from FITC-HSA coated onto 5 nm TSFs are presented in the real-color photographs shown in FIG. 2C-*Bottom*. It was noted that the angular-dependent fluorescence emission pattern for 5 nm TSF after the annealing process is similar to the angular-dependent scattering of light by the plasmonic structures themselves, although the presence of the glass substrate also makes a significant contribution to the angular dependent emission observed. (10) These results are consistent with UPFT where a fluorophore's excited state is thought to couple to surface plasmons and subsequently scatter at the same wavelength elastically and in an angular-dependent fashion. (3,10)

Figure 3:
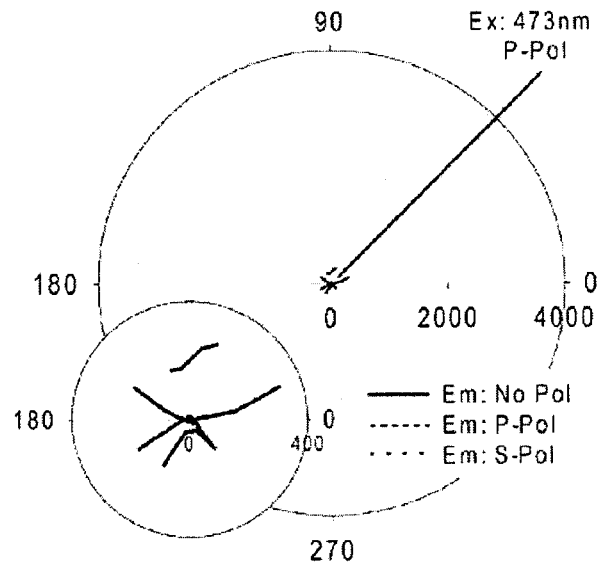
FIGS. 3 A, B and C show the results for 15 nm thick silver films before (top row) and after (bottom row) annealing at 200° C. for 1 hour in a vacuum oven: (A) polar plots for scattering of 473 nm excitation light (B) polar plots for fluorescence emission from FITC-HSA coated onto silver films, and (C) fluorescence emission spectrum measured at 225 degrees and real-color photograph of emission from FITC-HSA coated onto silver films. No Pol—No Polarization, P Pol: p-polarization, S Pol: s-polarization.
Figure 3:
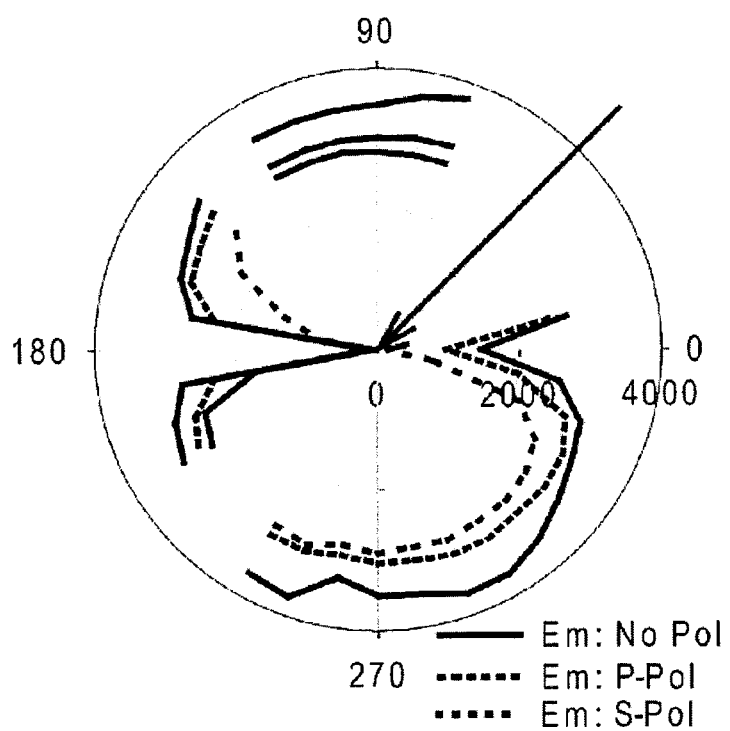
Figure 7:
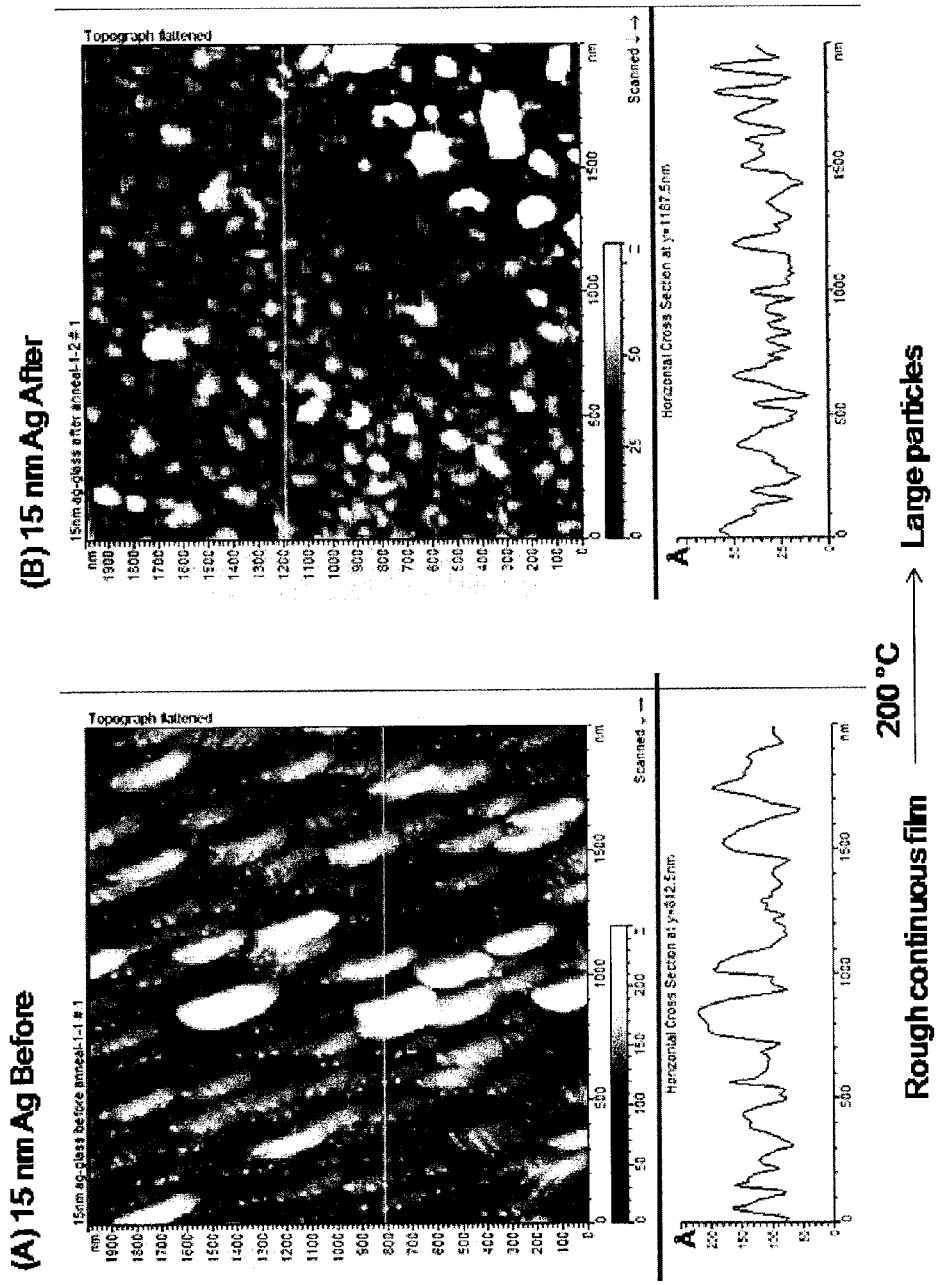
FIG. 7 shows Atomic Force Microscope images of 15 nm thick silver films before (A) and after (B) annealing at 200° C. for 1 hour in a vacuum oven.

FIG. 3A shows the polar plots for scattering of 473 nm light by a 15 nm TSF from a glass microscope slide, both before and after annealing. While the angular-dependent scattering of light from 15 nm TSF is similar to that from a thin reflective surface (mirror) before annealing, the angular-dependent light scattering pattern becomes similar to that from a surface that contains large nanoparticles, after the annealing process, FIG. 3A—Bottom. This assumption was confirmed through: 1) absorption measurements where we observed the appearance of the SPR peak for silver after annealing (FIG. 1B); 2) AFM analysis, where the globular silver particles are clearly seen (FIG. 7); and finally 3) angular-dependent light scattering, where the annealed 15 nm TSF scatter light similar to large silver nanoparticles (FIG. 3A—Bottom).

Figure 3B:
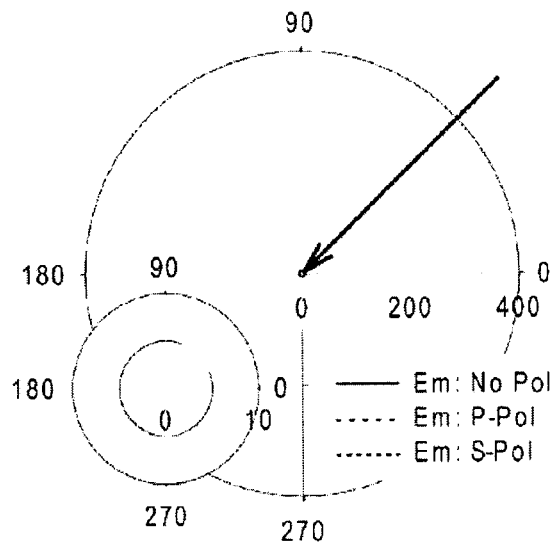
Figure 3B:
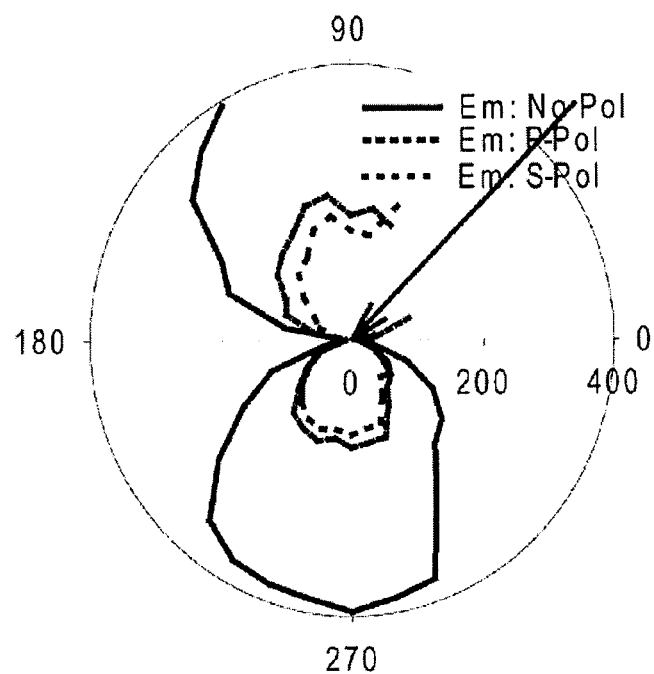
Figure 3C:
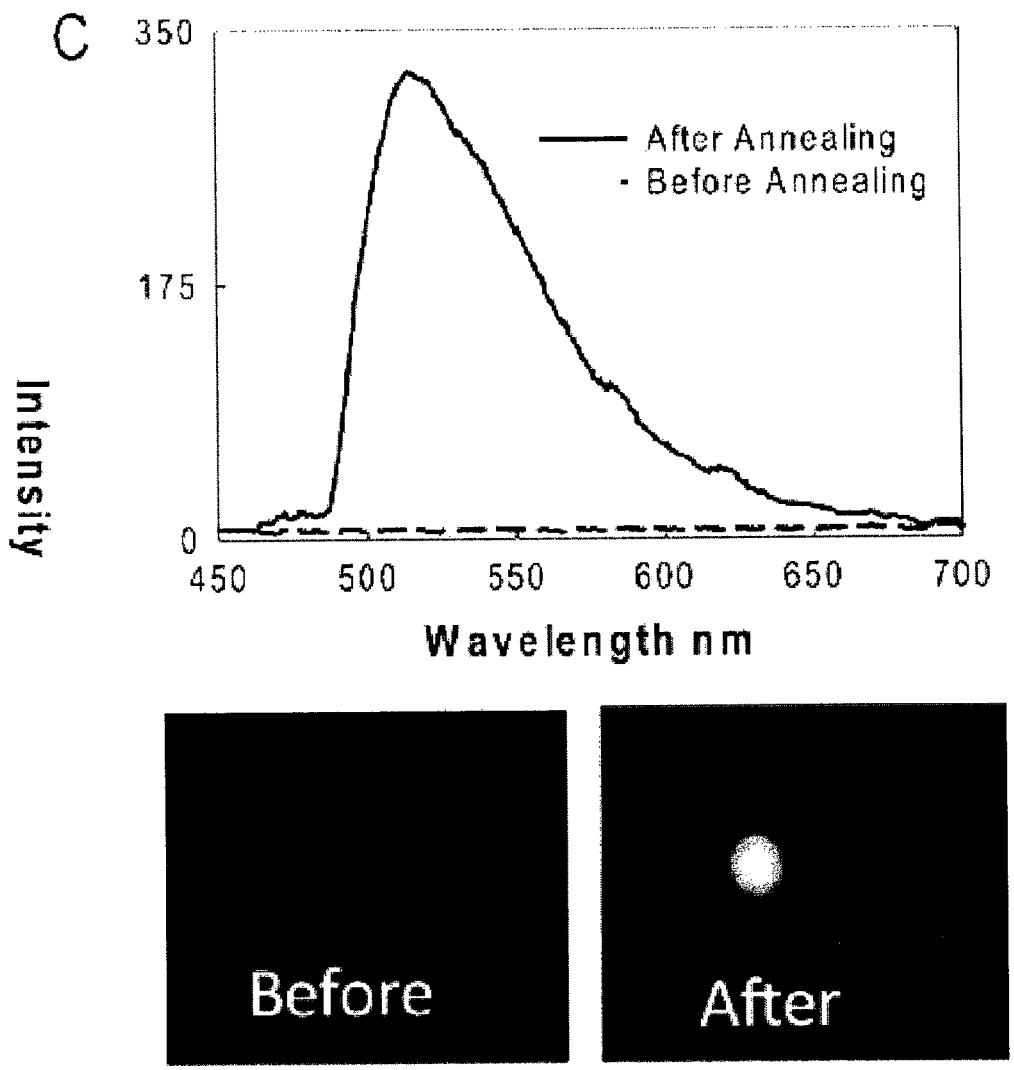

FIGS. 3B and 3C show the polar plots of fluorescence emission and fluorescence spectra measured at 225° from FITC-HSA coated onto 15 nm TSF before and after annealing, respectively. It is noted that both the fluorescence polar plots and photographs were taken through an emission filter. While no fluorescence emission was observed at all observation angles from a 15 nm TSF before annealing, angular-dependent fluorescence emission from annealed 15 nm TSF can readily be observed. A snapshot of fluorescence emission at an observation angle of 225° shows visual evidence of the significantly larger fluorescence emission from FICT-HSA coated onto annealed 15 nm TSFs, FIG. 3C (enhancement factor=30-fold). It is noted that angular-dependent fluorescence emission shown in FIG. 3B is similar to the angular-dependent scattering of light by the annealed 15 nm TSF, which supports UPFT. (3) These results indicate that a just-continuous silver film can be "cracked" or "globulated" and made non-continuous, to produce very large particles, which are somewhat difficult to grow and deposit by wet-chemical deposition techniques and can therefore be utilized for downstream applications in metal-enhanced fluorescence. An increase in particle height (size) was observed resulting in increased scattering intensities. However, there was not the large distances between the particles as shown in the 5 nm TSF thereby providing for a substantial increase in the overall angular-dependent scattering intensities.

Figure 4A:
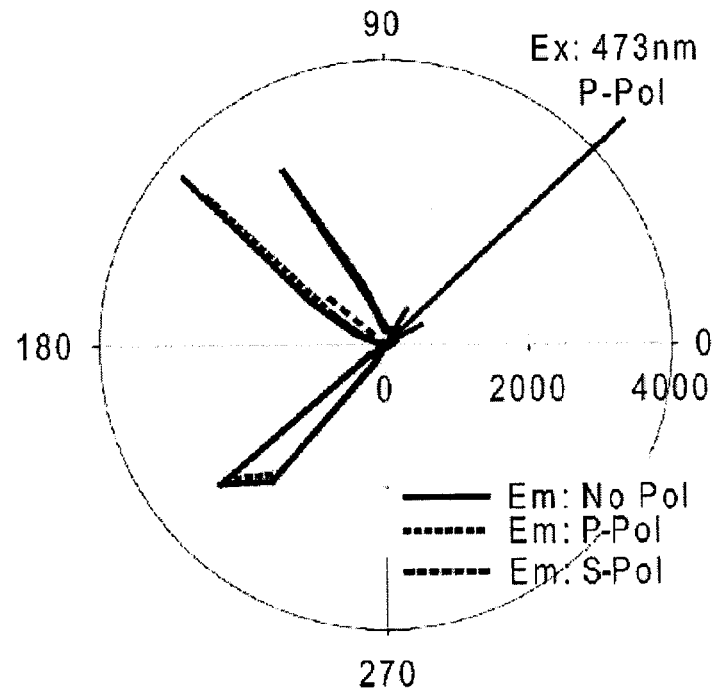
FIGS. 4 A and B show polar plots for 25 nm thick silver films before (top row) and after (bottom row) annealing at 200° C. for 1 hour in a vacuum oven: (A) scattering of 473 nm excitation light (B) fluorescence emission from FITC-HSA coated onto silver films measured at 225 degrees. No Pol—No Polarization, P Pol: p-polarization, S Pol: s-polarization.
Figure 4A:
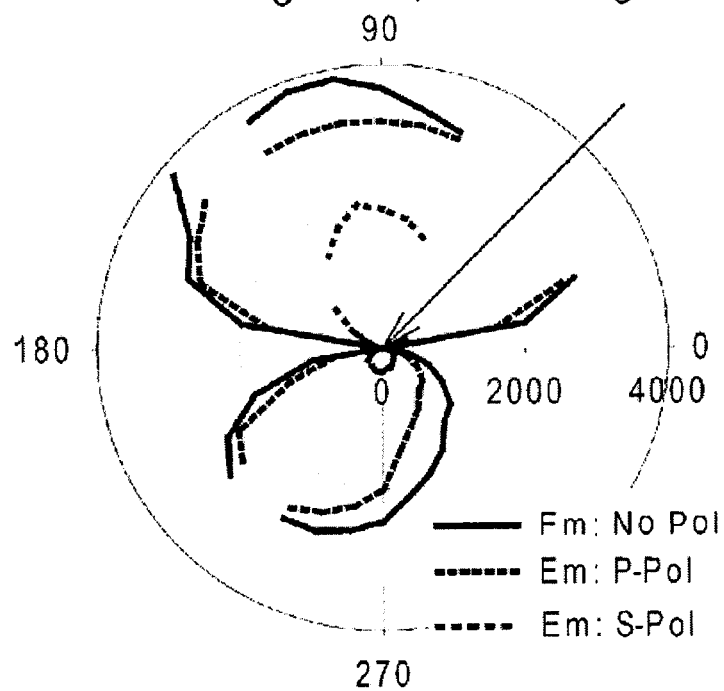
Figure 4B:
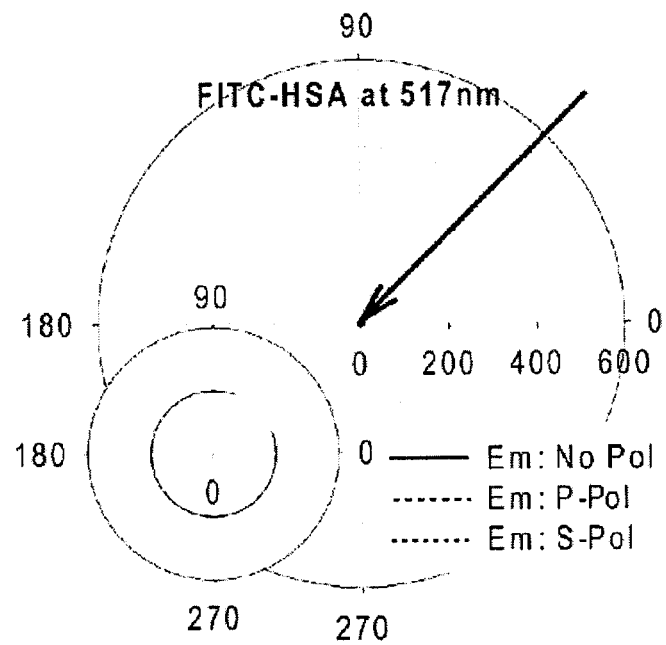
Figure 4B:
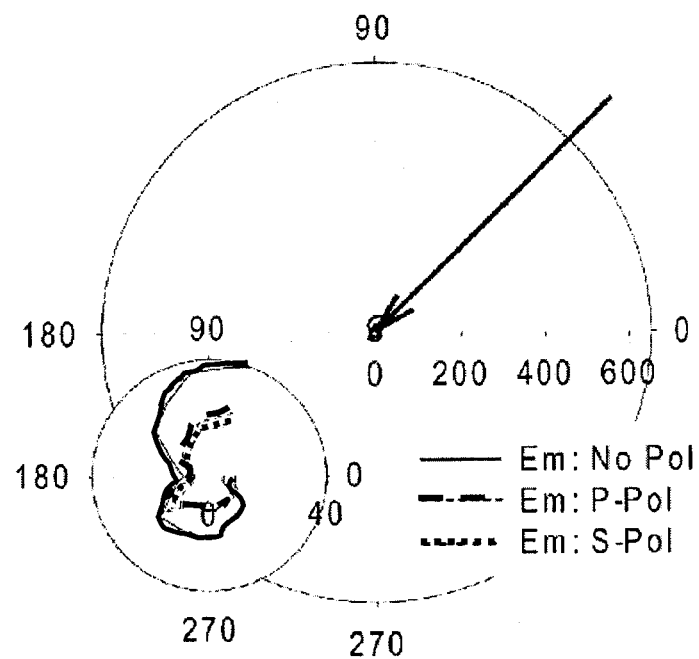
Figure 8:
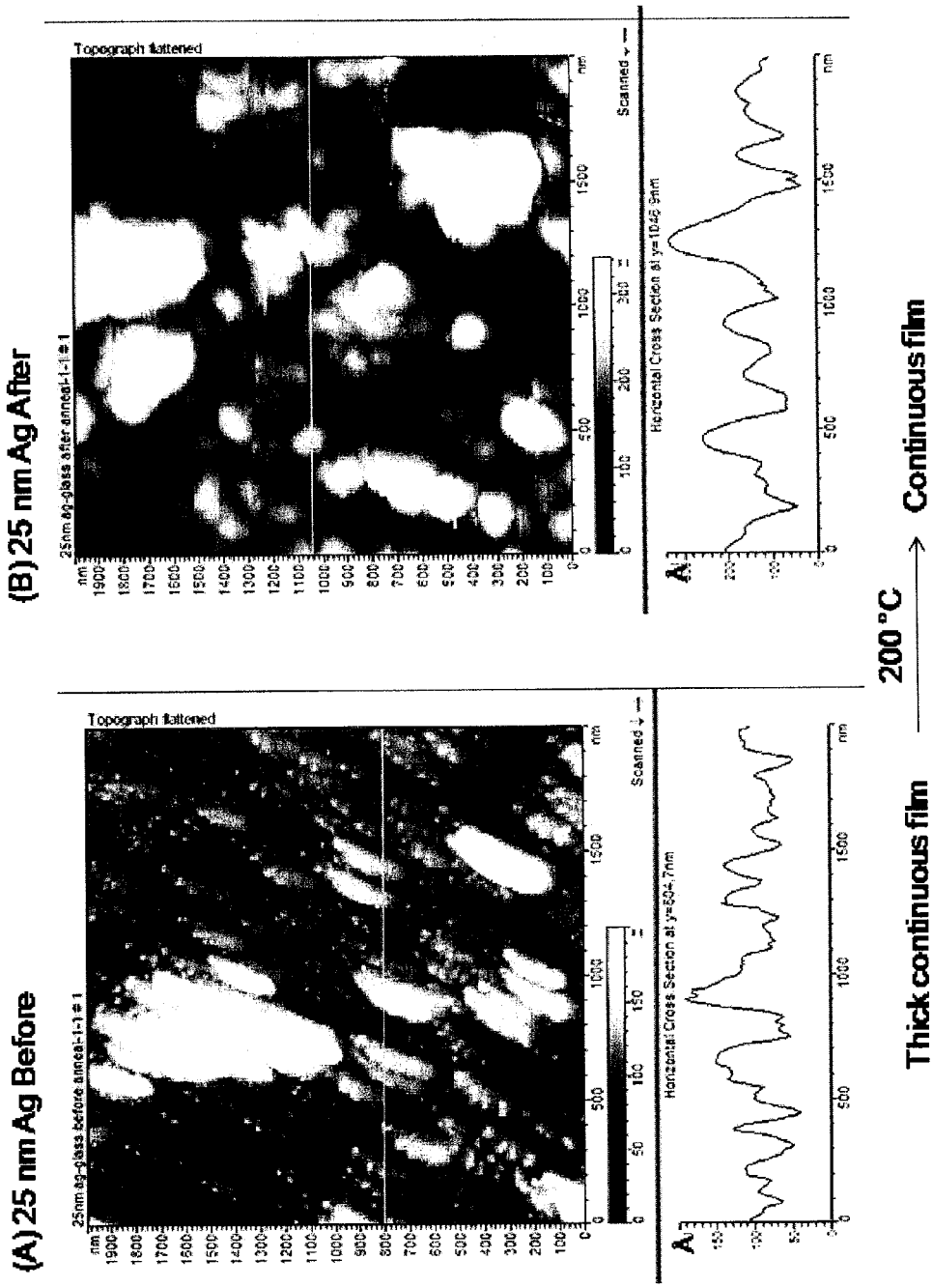
FIG. 8 shows Atomic Force Microscope images of 25 nm thick silver films before (A) and after (B) annealing at 200° C. for 1 hour in a vacuum oven.

To show the enhancement of fluorescence is facilitated through the coupling of a fluorophore's dipole to surface plasmons, and not due to random scattering of light by metallic surfaces or indeed other mechanisms, a much thicker TSF was studied, where under the conditions used the thick film cannot support surface plasmons. In this regard, the angular-dependent light scattering and angular-dependent fluorescence emission from 25 nm TSFs were measured both before and after annealing, FIG. 4. FIG. 4A shows the polar plots for scattering of 473 nm laser light by 25 nm TSF on a glass microscope slide both before and after annealing. While the angular-dependent scattering of light from 25 nm TSF is similar to that from a thin reflective surface (mirror) before annealing, where the light is mostly reflected, after the annealing process the angular-dependent light scattering pattern shows a slightly broader forward scattering profile, but the majority of light is still scattered into the back excitation half-space. AFM analysis of the 25 nm TSF before and after annealing reveals the continuous film nature (FIG. 8) as also confirmed by the absorption spectra shown in FIG. 1C. FIG. 4B shows the polar plots of fluorescence emission from FITC-HSA coated onto 25 nm TSF before and after annealing. As expected, little to no fluorescence signal was observed from the 25 nm TSFs both before and after annealing. These results indicate that 25 nm TSFs cannot be converted using the procedures described herein, into substrates for applications in MEF, and moreover, that under the conditions used here, the continuous films cannot support an SPR, an important criterion for MEF. (3)

Figure 5A:
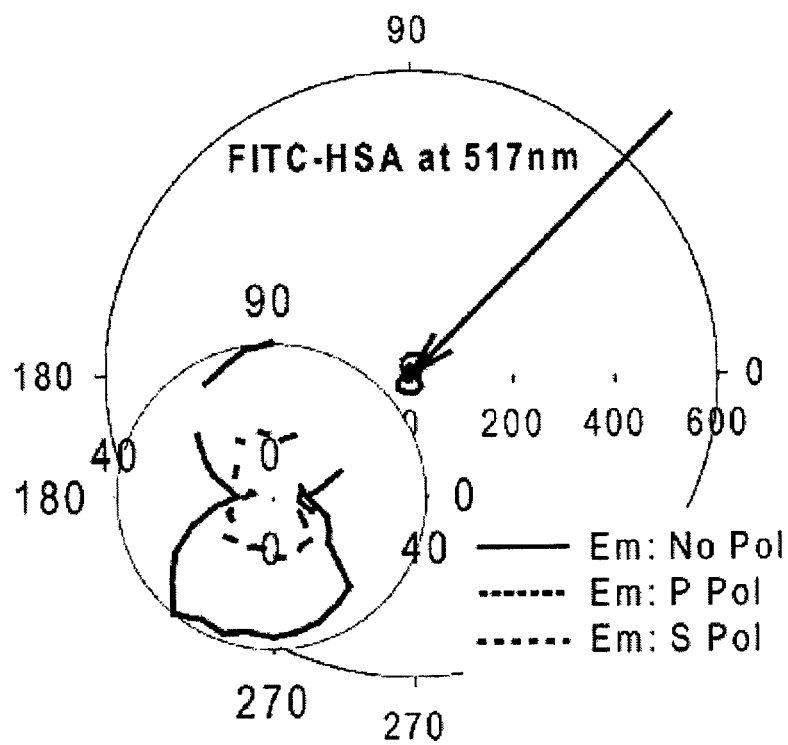
FIGS. 5 A, B and C show polar plots for (A) fluorescence emission from FITC-HSA coated glass slides and (B) fluorescence enhancement factor, i.e., the ratio of emission intensity of FITC-HSA at 517 nm on silver films, after annealing and the emission intensity of FITC-HSA on glass slides measured at 225 degrees. (C) Photostability of FITC-HSA measured at 225 and 340 degrees on a 15 nm annealed silver film. A separate experiment, where the initial emission intensity at 225 degrees was matched to the steady-state emission intensity at 340 degrees by reducing the excitation intensity with a neutral density filter, was also undertaken. Real-color photographs show the fluorescence emission from FITC-HSA taken through a 532 nm emission filter at 225 degrees. No Pol—No Polarization, P Pol: p-polarization, S Pol: s-polarization.
Figure 5A:
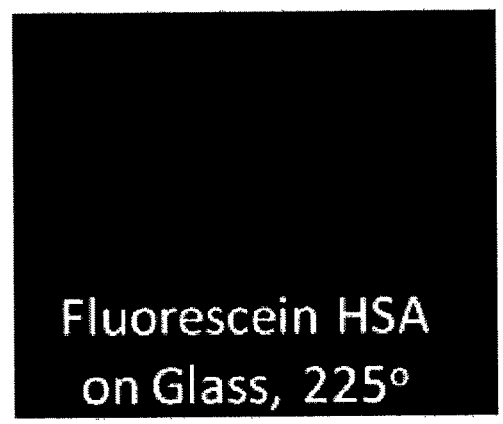
Figure 5B:
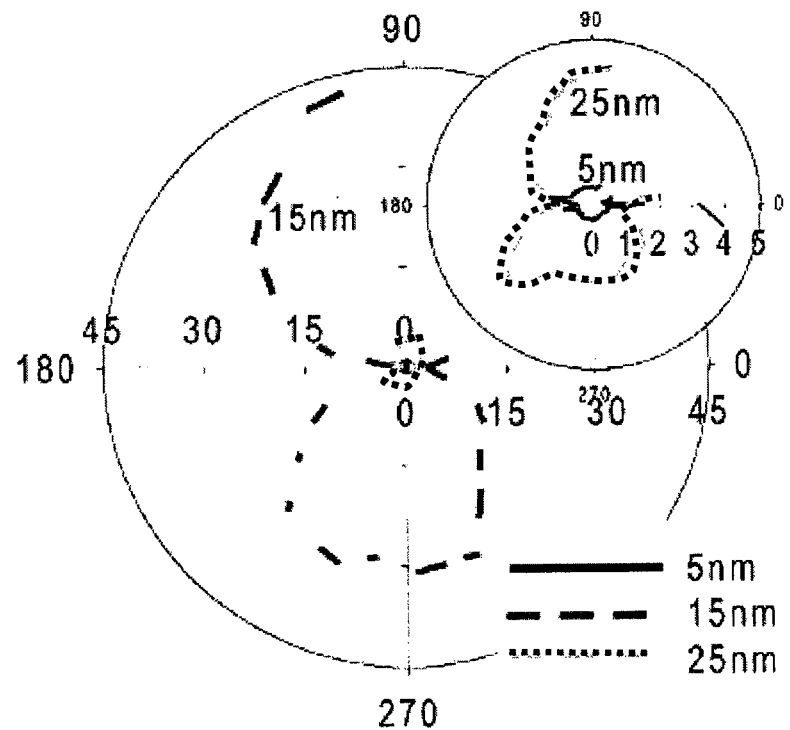
Figure 5B:
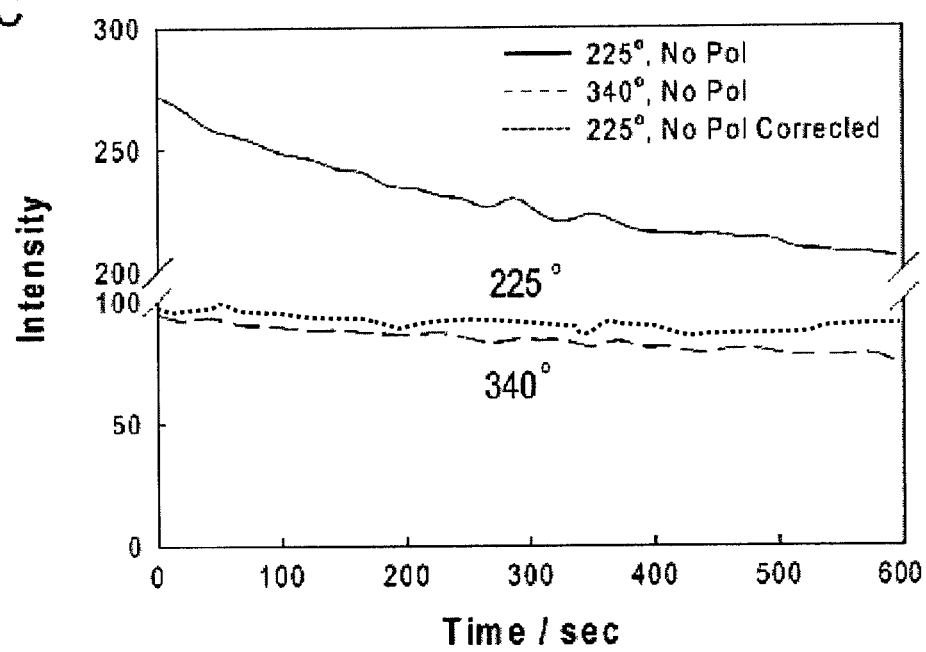

In order to quantitate the ability of TSFs for MEF, the angular-dependent fluorescence intensity was measured from FITC-HSA coated onto a control sample substrate that does not contain TSFs, and compared the results to the fluorescence emission intensities obtained for annealed TSFs as shown in FIGS. 5A and 5B. Angular-dependent fluorescence emission and a real-color photograph for fluorescence emission taken at 225° from a FITC-HSA coated glass microscope slide both show the very weak fluorescence emission from the glass substrate, FIG. 5A, a control sample. FIG. 5B shows the fluorescence enhancement factor, i.e., the ratio of emission intensity of FITC-HSA at 517 nm on annealed TSFs and the emission intensity of FITC-HSA on glass slides measured at 225°. The fluorescence emission intensity from annealed 15 nm TSF is up to 30-fold larger as compared to the control glass surface, while the fluorescence emission is 8-fold larger for annealed 5 nm TSF. No enhanced fluorescence is observed from the annealed 25 nm TSF, as expected. (3)

It has been previously shown that the photostability of fluorophores near plasmonic nanoparticles varies with the angle of observation (degree of fluorophore coupling), (34) which arises from the fact that the scattering of light and fluorescence enhancement both vary with the angle of observation. As such, the photostability of FITC-HSA at 225° was measured (in the direction of propagation of the incident light) and 340° (away from the direction of the propagation) on 15 nm annealed TSF. A separate experiment, where the initial emission intensity at 225° was matched to the initial steady-state emission intensity at 340° by reducing the excitation intensity with a neutral density filter, was also undertaken. It was observed that the photostability of FITC, indeed, depends slightly on the observation angle providing with additional evidence that both MEF and enhanced fluorophore photostabilities can be observed from annealed 15 nm TSF, FIG. 5C.

Thus, it has been found that silver films ≈15 nm thick readily reflect visible light, their absorption/transmission spectra not unlike a conventional thin optical silver mirror. Importantly, when thermally annealed in the absence of oxygen after initial deposition of a continuous film, the films "crack" (globulate), producing very large nanoparticles. It has been demonstrated that annealed just-continuous films, having a thickness from about 10 nm to about 17 nm are ideal substrates for MEF, producing ≈30-fold enhancements in fluorescence, which appear more suitable than the much smaller SiFs, common substrates used for MEF. (2)

REFERENCES

The contents of the following references are incorporated by reference herein for all purposes 1. C. D. Geddes and J. R. Lakowicz, Journal of Fluorescence 12, 121-129 (2002).
2. K. Aslan, I. Gryczynski, J. Malicka, E. Matveeva, J. R. Lakowicz, and C. D. Geddes, Current Opinion in Biotechnology 16, 55-62 (2005).
3. K. Aslan, M. J. R. Previte, Y. X. Zhang, and C. D. Geddes, Biophysical Journal, 371A-371A (2007).
4. J. R. Lakowicz, Analytical Biochemistry 298, 1-24 (2001).
5. Y. Zhang, K. Aslan, M. J. Previte, and C. D. Geddes, Chemical Physics Letters 432, 528-532 (2006).
6. M. H. Chowdhury, K. Aslan, S, N. Malyn, J. R. Lakowicz, and C. D. Geddes, Applied Physics Letters 88, 173104 (2006).
7. Y. Zhang, K. Aslan, M. J. Previte, and C. D. Geddes, Applied Physics Letters 90, 053107 (2007).
8. K. Aslan, Z. Leonenko, J. R. Lakowicz, and C. D. Geddes, Journal of Fluorescence 15, 643-654 (2005).
9. J. Yguerabide and E. E. Yguerabide, Analytical Biochemistry 262, 137-156 (1998).
10. K. Aslan, S, N. Malyn, and C. D. Geddes, Analyst 132, 1112-1121 (2007).
11. K. Aslan, P. Holley, L. Davies, J. R. Lakowicz, and C. D. Geddes, Journal of the American Chemical Society 127, 12115-12121 (2005).
12. Y. Zhang, K. Aslan, M. J. R. Previte, and C. D. Geddes; Vol. 90 (AIP, 200'7), p. 173116.
13. M. H. Chowdhury, S, N. Malyn, K. Aslan, J. R. Lakowicz, and C. D. Geddes, Journal of Physical Chemistry B 110, 22644-22651 (2006).
14. M. J. R. Previte, K. Aslan, Y. X. Zhang, and C. D. Geddes, Journal of Physical Chemistry C 111, 6051-6059 (2007).
15. C. Zhang, K. Abdijalilov, and H. Grebel, J Chem Phys 127, 044701 (2007).
16. K. R. Strehle, D. Cialla, P. Rosch, T. Henkel, M. Kohler, and J. Popp, Anal Chem 79, 1542-7 (2007).
17. Q. Yu and G. Golden, Langmuir 23, 8659-62 (2007).
18. K. Aslan, J. Huang, G. M. Wilson, and C. D. Geddes, Journal of the American Chemical Society 128, 4206-4207 (2006).
19. D. S. dos Santos and R. F. Aroca, Analyst 132, 450-454 (2007).
20. C. D. Geddes, A. Parfenov, D. Roll, J. Y. Fang, and J. R. Lakowicz, Langmuir 19, 6236-6241 (2003).
21. A. Feofanov, A. Ianoul, E. Kryukov, S. Maskevich, G. Vasiliuk, L. Kivach, and I. Nabiev, Analytical Chemistry 69, 3731-3740 (1997).
22. K. Aslan, P. Holley, and C. D. Geddes, Journal of Materials Chemistry 16, 2846-2852 (2006).
23. H. J. Park, D. Vak, Y. Y. Noh, B. Lim, and D. Y. Kim, Applied Physics Letters 90 (2007).
24. D. S. Dunn, N. Sridhar, M. A. Miller, K. T. Price, R. Pabalan, and T. A. Abrajano, Jr., Appl Spectrosc 61, 25-31 (2007).
25. H. Li and B. M. Cullum, Appl Spectrosc 59, 410-7 (2005).
26. M. Kawasaki and S. Mine, Journal of Physical Chemistry B 109, 17254-17261 (2005).
27. M. Kawasaki and S. Mine, Chemistry Letters 34, 1038-1039 (2005).
28. Y. Suzuki, Y. Ojima, Y. Fukui, H. Fazyia, and K. Sagisaka, Thin Solid Films 515, 3073-3078 (2007).
29. N. Strekal, A. Maskevich, S. Maskevich, J. C. Jardillier, and I. Nabiev, Biopolymers 57, 325-8 (2000).
30. L. Hao and J. Lawrence, Colloids and Surfaces B-Biointerfaces 34, 87-94 (2004).
31. K. Aslan and C. D. Geddes, Plasmonics 1, 53-59 (2006).
32. I. Doron-Mor, Z. Barkay, N. Filip-Granit, A. Vaskevich, and I. Rubinstein, Chemistry of Materials 16, 3476-3483 (2004).
33. C. D. Geddes, H. Cao, I. Gryczynski, Z. Gryczynski, J. Fang, and J. R. Lakowicz, Journal of Physical Chemistry A 107, 3443-3449 (2003).
34. K. Aslan, S, N. Malyn, and C. D. Geddes, J Fluoresc 17, 7-13 (2007).

That which is claimed is:

1. A method of fabricating a cracked surface that includes a plurality of nanoparticles having a cross-sectional diameter from about 60 nm to about 150 nm and a thin silver film layer less than the height of the nanoparticles positioned between the nanoparticles, the method comprising:
   providing a substrate;
   depositing a 12 nm to about 17 nm continuous layer of silver on the substrate to form a just continuous silver film coating the substrate;
   heating the silver film and substrate to a temperature of from about 170° C. to about 230° C. under anaerobic conditions for about 0.5 to 2.5 hours to provide crackage in the silver film thereby forming annealed nanoparticles having a cross-sectional diameter from about 60 nm to about 150 nm and a thin silver film layer remaining between the nanoparticles having a thickness less than the unannealed deposited layer of silver,
   wherein the annealed nanoparticles provide for increased metal enhanced fluorescence relative to an unannealed film.

2. The method of claim 1, wherein the surface substrate is glass, quartz, polymeric material or a metallic surface not including silver.

3. The method of claim 1, wherein the annealing temperature is from about 190° C. to about 210° C.

4. The method of claim 1, wherein the annealed nanoparticles have a surface plasmon resonance (SPR) peak that is blue shifted relative to the unannealed surface.

5. A detection method exhibiting increased fluorescence emitted during metal-enhanced fluorescence sensing, the detection method comprising:
   applying a metallic material to a surface substrate used in a detection system to form individual nanoparticles having a cross-sectional diameter from about 60 nm to about 150 nm and a thin silver film layer less than the height of the nanoparticles positioned between the nanoparticles, wherein the metallic material is formed by:
      providing a substrate;
      depositing a 12 to 17 nm thick continuous layer of silver on the substrate to form a continuous silver film coating the substrate;
      heating the silver film and substrate to a temperature of about 190° C. to 210° C. under anaerobic conditions for a sufficient amount of time to form annealed nanoparticles and a thin silver film layer remaining between the nanoparticles having a thickness less than the unannealed deposited layer of silver;
   providing a an intrinsic or extrinsic fluorophore for disposing near the annealed nanoparticles,
   exciting the fluorophore with an electromagnetic source to cause fluorescing; and
   measuring the fluorescence emission within the fluorophore and/or annealed nanoparticles.

6. The detection method according to claim 5, further comprising the step of applying electromagnetic energy in the microwave range to cause an increase in heat in the system thereby increasing the kinetics of any chemical reactions occurring within the detection system.

7. The method of claim 5, wherein the heating period is about 0.5 to 2.5 hours.

8. The method of claim 5, wherein the heating period is about 1 hour.

9. The method of claim 5 wherein the thickness of the deposited silver film layer, before annealing, is from about 14 nm to 16 nm thick.

10. The method of claim 5, wherein the annealed nanoparticles have a surface plasmon resonance (SPR) peak that is blue shifted relative to the unannealed surface.

11. A cracked silver surface that comprises individual nanoparticles having a cross-sectional diameter from about 60 nm to about 150 nm; and
   a thin silver film layer less than the height of the nanoparticles and positioned between the nanoparticles, wherein the cracked silver surface is fabricated by a method comprising:
      providing a substrate;
      depositing a 12 to 17 nm thick continuous layer of silver on the substrate to form a silver coated substrate; and
      heating the silver coated substrate to a temperature of about 190° C. to 210° C. under anaerobic conditions for a time period of about 0.5 to 2.5 hours to provide crackage in the silver film thereby forming annealed nanoparticles having a cross-sectional diameter from about 60 nm to about 150 nm and a thin silver film layer remaining between the nanoparticles having a thickness less than the unannealed deposited layer of silver,
   wherein the annealed nanoparticles provide for increased metal enhanced fluorescence relative to an unannealed film.

12. The silver biosensor surface of claim 11, wherein the annealed nanoparticles include a height greater than the thickness of the unannealed deposited layer of silver, whereby the silver is conserved and redistributed during the annealing process.

13. The silver biosensor surface of claim 11, wherein the annealing is conducted in about one hour.

14. The silver biosensor surface of claim 11, wherein the thickness of the deposited silver film layer, before annealing, is from about 14 nm to 16 nm thick.

15. The silver biosensor surface of claim 11, wherein the annealed nanoparticles have a surface plasmon resonance (SPR) peak that is blue shifted relative to the unannealed surface.

16. The silver biosensor surface of claim 11, wherein the surface substrate is glass, quartz, polymeric material or a metallic surface not including silver.

17. The silver biosensor surface of claim 11, further comprising the step of applying electromagnetic energy in the microwave range to cause an increase in heat in the system thereby increasing the kinetics of any chemical reactions occurring within the detection system.

* * * * *